United States Patent
Baba

(10) Patent No.: US 10,406,927 B2
(45) Date of Patent: Sep. 10, 2019

(54) ELECTRICITY MANAGEMENT DEVICE, ELECTRICITY MANAGEMENT METHOD, AND ELECTRICITY DISTRIBUTION SYSTEM INSIDE A HOUSE WITH ELECTRICITY GENERATING DEVICE, UTILITY GRID CONNECTION, AND ELECTRIC VEHICLE CONTAINING A RECHARGEABLE BATTERY IN A VEHICLE-TO-GRID CONNECTION WITH COUNTER DEVICE

(71) Applicant: PANASONIC CORPORATION, Osaka (JP)

(72) Inventor: Akira Baba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/359,899

(22) PCT Filed: Nov. 19, 2012

(86) PCT No.: PCT/JP2012/007413
§ 371 (c)(1),
(2) Date: May 21, 2014

(87) PCT Pub. No.: WO2013/076957
PCT Pub. Date: May 30, 2013

(65) Prior Publication Data
US 2014/0312841 A1 Oct. 23, 2014

(30) Foreign Application Priority Data

Nov. 22, 2011 (JP) .................. 2011-254883

(51) Int. Cl.
*B60L 11/18* (2006.01)
*H02J 3/32* (2006.01)
(Continued)

(52) U.S. Cl.
CPC ........... *B60L 11/1824* (2013.01); *B60L 53/30* (2019.02); *B60L 55/00* (2019.02); *H02J 3/32* (2013.01);
(Continued)

(58) Field of Classification Search
CPC .............. B60L 11/1842; B60L 11/1824; Y02E 10/563; H02J 3/32; H02J 3/383; H02J 7/00; H02J 7/35
(Continued)

(56) References Cited

U.S. PATENT DOCUMENTS 6,542,791 B1 * 4/2003 Perez .................. G05F 1/67
307/66
6,889,122 B2 * 5/2005 Perez .................. G05F 1/67
307/66
(Continued)

FOREIGN PATENT DOCUMENTS

| JP | 11-018317 A | 1/1999 |
|---|---|---|
| JP | 2001-008380 A | 1/2001 |
| JP | 2006-288016 A | 10/2006 |
| JP | 2007207140 A * | 8/2007 |

(Continued)

OTHER PUBLICATIONS

"Electric Vehicles, Smart Grid, Residential Solar Power: A Virtuous Circle Emerges," Andrew, Clean Technica, Published Sep. 12, 2011, Accessed May 20, 2016, http://cleantechnica.com/2011/09/12/electric-vehicles-smart-grid-residential-solar-power-a-virtuous-circle-emerges/.*

(Continued)

Primary Examiner — Robert Grant
Assistant Examiner — John T Trischler
(74) Attorney, Agent, or Firm — McDermott Will & Emery LLP

(57) ABSTRACT

A electricity management device increases a counter value as an electric vehicle is charged from grid power that is supplied from an electrical grid, retains the counter value when the electric vehicle is charged from electricity generated by an electricity generation device, and reduces the (Continued)

counter value as electricity in the electric vehicle is discharged to a distribution board.

6 Claims, 11 Drawing Sheets

(51) Int. Cl.
  *H02J 3/38* (2006.01)
  *B60L 53/30* (2019.01)
  *B60L 55/00* (2019.01)
  *H02J 3/00* (2006.01)
(52) U.S. Cl.
  CPC ......... *H02J 3/383* (2013.01); *H02J 2003/007* (2013.01); *Y02E 10/563* (2013.01); *Y02E 10/566* (2013.01); *Y02E 60/721* (2013.01); *Y02E 70/30* (2013.01); *Y04S 10/126* (2013.01)
(58) Field of Classification Search
  USPC .................................................. 320/109, 101
  See application file for complete search history.

(56) References Cited

U.S. PATENT DOCUMENTS

| | | | | |
|---|---|---|---|---|
| 7,067,319 B2* | 6/2006 | Wills | ............... | F01N 3/2066 422/111 |
| 7,120,520 B2* | 10/2006 | Seto | ............... | B60L 11/1824 700/297 |
| 7,693,609 B2* | 4/2010 | Kressner | ............... | B60L 11/14 320/109 |
| 7,792,613 B2* | 9/2010 | Kressner | ............... | B60L 11/14 320/104 |
| 7,917,252 B2* | 3/2011 | Imagawa | ............... | H01M 8/04298 320/101 |
| 7,956,570 B2* | 6/2011 | Lowenthal | ............... | B60L 11/1816 320/104 |
| 8,055,437 B2* | 11/2011 | Proietty | ............... | F02D 41/1445 340/439 |
| 8,063,605 B2* | 11/2011 | Tonegawa | ............... | B60K 6/445 320/107 |
| 8,103,386 B2* | 1/2012 | Ichikawa | ............... | B60L 11/1811 700/286 |
| 8,143,842 B2* | 3/2012 | Tyler | ............... | B60L 11/1816 320/104 |
| 8,151,916 B2* | 4/2012 | Gearhart | ............... | B60W 10/06 180/65.21 |
| 8,165,891 B2* | 4/2012 | Roberts | ............... | G06Q 10/06393 705/1.1 |
| 8,307,225 B2* | 11/2012 | Forbes, Jr. | ............... | G01D 4/004 700/22 |
| 8,315,717 B2* | 11/2012 | Forbes, Jr. | ............... | G01D 4/004 323/299 |
| 8,330,415 B2* | 12/2012 | Sato | ............... | B60L 3/12 180/65.29 |
| 8,364,609 B2* | 1/2013 | Ozog | ............... | G06Q 10/06315 705/412 |
| 8,457,821 B2* | 6/2013 | Shaffer | ............... | B60L 11/184 180/272 |
| 8,509,976 B2* | 8/2013 | Kempton | ............... | B60L 11/1824 701/22 |
| 8,548,659 B2* | 10/2013 | Tanaka | ............... | B60K 6/48 180/65.1 |
| 8,676,636 B2* | 3/2014 | Genschel | ............... | G06Q 30/00 235/381 |
| 8,680,813 B2* | 3/2014 | Lowenthal | ............... | B60L 11/1816 320/109 |
| 8,700,187 B2* | 4/2014 | Forbes, Jr. | ............... | G01D 4/004 323/299 |
| 8,725,306 B2* | 5/2014 | Ramezani | ............... | B60L 11/1844 320/109 |
| 8,725,338 B2* | 5/2014 | Tanaka | ............... | B60K 6/48 180/65.1 |
| 8,744,641 B2* | 6/2014 | Ito | ............... | H02J 3/32 250/203.4 |
| 8,768,533 B2* | 7/2014 | Ichikawa | ............... | H04L 25/028 180/65.29 |
| 8,803,480 B2* | 8/2014 | Muto | ............... | B60L 11/1842 320/128 |
| 8,831,786 B2* | 9/2014 | Son | ............... | B60L 11/1816 320/109 |
| 8,831,803 B2* | 9/2014 | Yamamoto | ............... | B60W 20/13 701/22 |
| 8,843,238 B2* | 9/2014 | Wenzel | ............... | G05D 23/1923 700/277 |
| 8,849,471 B2* | 9/2014 | Daniel | ............... | F03D 9/00 700/293 |
| 8,855,279 B2* | 10/2014 | Forbes, Jr. | ............... | G06Q 10/00 379/1.03 |
| 8,872,379 B2* | 10/2014 | Ruiz | ............... | B60L 11/1816 307/66 |
| 8,928,280 B2* | 1/2015 | Sugiyama | ............... | B60L 11/1842 320/109 |
| 8,959,559 B2* | 2/2015 | Nishimura | ............... | H04N 21/237 370/252 |
| 8,963,502 B2* | 2/2015 | Abe | ............... | 320/132 |
| 8,975,779 B2* | 3/2015 | Cooper | ............... | H02J 3/14 307/20 |
| 8,996,183 B2* | 3/2015 | Forbes, Jr. | ............... | G06Q 10/00 700/291 |
| 9,013,062 B2* | 4/2015 | Kinomura | ............... | B60L 11/12 307/44 |
| 9,026,347 B2* | 5/2015 | Gadh | ............... | B60L 11/1842 320/109 |
| 9,043,038 B2* | 5/2015 | Kempton | ............... | B60L 11/1824 700/291 |
| 9,071,066 B2* | 6/2015 | Iwamoto | ............... | H02J 7/0055 |
| 9,085,241 B2* | 7/2015 | Asano | ............... | B60L 11/1809 713/300 |
| 9,117,248 B2* | 8/2015 | King | ............... | G06Q 30/04 |
| 9,153,963 B2* | 10/2015 | Baba | ............... | H02J 3/32 |
| 9,207,698 B2* | 12/2015 | Forbes, Jr. | ............... | H02J 3/14 |
| 9,302,590 B2* | 4/2016 | Santos Silva Serra Duarte | ............... | B60L 11/1824 |
| 9,305,454 B2* | 4/2016 | Forbes, Jr. | ............... | G06Q 10/00 |
| 9,322,566 B2* | 4/2016 | Wenzel | ............... | G05D 23/1923 |
| 9,523,991 B2* | 12/2016 | Baba | ............... | G05F 1/66 |
| 9,754,300 B2* | 9/2017 | Kempton | ............... | B60L 11/1824 |
| 2003/0047209 A1* | 3/2003 | Yanai | ............... | H02J 3/32 136/244 |
| 2004/0249516 A1* | 12/2004 | Seto | ............... | B60L 11/1824 700/295 |
| 2007/0282495 A1* | 12/2007 | Kempton | ............... | B60L 8/00 701/22 |
| 2009/0030712 A1* | 1/2009 | Bogolea | ............... | B60L 11/1816 705/1.1 |
| 2009/0055299 A1* | 2/2009 | King | ............... | G06Q 30/04 705/34 |
| 2009/0069999 A1* | 3/2009 | Bos | ............... | G07C 5/085 701/102 |
| 2009/0096416 A1* | 4/2009 | Tonegawa | ............... | B60K 6/445 320/109 |
| 2009/0171722 A1* | 7/2009 | Roberts | ............... | G06Q 10/06393 705/7.39 |
| 2009/0174365 A1* | 7/2009 | Lowenthal | ............... | B60L 11/1816 320/109 |
| 2009/0177580 A1* | 7/2009 | Lowenthal | ............... | B60L 11/1824 705/39 |
| 2009/0192655 A1* | 7/2009 | Ichikawa | ............... | B60L 11/1811 700/291 |
| 2009/0212633 A1* | 8/2009 | Fein | ............... | B60K 16/00 307/69 |
| 2010/0013436 A1* | 1/2010 | Lowenthal | ............... | G06Q 30/04 320/109 |
| 2010/0017045 A1* | 1/2010 | Nesler | ............... | B60L 11/1824 700/296 |
| 2010/0045046 A1* | 2/2010 | Douglas | ............... | F03B 13/16 290/54 |

(56) References Cited

U.S. PATENT DOCUMENTS

| | | | |
|---|---|---|---|
| 2010/0049533 A1* | 2/2010 | Ferro | G06Q 10/087 705/1.1 |
| 2010/0076615 A1* | 3/2010 | Daniel | F03D 9/00 700/293 |
| 2010/0076825 A1* | 3/2010 | Sato | B60L 3/12 705/14.1 |
| 2010/0138066 A1* | 6/2010 | Kong | G06Q 30/018 700/295 |
| 2010/0141205 A1* | 6/2010 | Tyler | B60L 11/1816 320/109 |
| 2010/0161391 A1* | 6/2010 | Ashby | G06Q 30/02 705/13 |
| 2010/0187030 A1* | 7/2010 | Gearhart | B60W 10/06 180/65.265 |
| 2010/0207448 A1* | 8/2010 | Cooper | H02J 3/14 307/20 |
| 2010/0207588 A1* | 8/2010 | Lowenthal | B60L 11/1816 320/165 |
| 2010/0235008 A1* | 9/2010 | Forbes, Jr. | G06Q 10/00 700/291 |
| 2011/0000726 A1 | 1/2011 | Tanaka | |
| 2011/0025267 A1* | 2/2011 | Kamen | B60L 8/003 320/109 |
| 2011/0055036 A1* | 3/2011 | Helfan | G06Q 30/04 705/26.1 |
| 2011/0137763 A1* | 6/2011 | Aguilar | G06Q 30/018 705/30 |
| 2011/0153224 A1* | 6/2011 | Iwamoto | H02J 7/0055 702/24 |
| 2011/0153474 A1* | 6/2011 | Tormey | G06Q 20/40 705/31 |
| 2011/0184575 A1* | 7/2011 | Kawamoto | G06Q 50/06 700/292 |
| 2011/0184585 A1* | 7/2011 | Matsuda | G06F 1/26 700/297 |
| 2011/0185196 A1* | 7/2011 | Asano | B60L 11/1809 713/300 |
| 2011/0185198 A1* | 7/2011 | Ukita | G06Q 50/06 713/300 |
| 2011/0202192 A1* | 8/2011 | Kempton | B60L 11/1824 700/291 |
| 2011/0202217 A1* | 8/2011 | Kempton | B60L 11/1824 701/22 |
| 2011/0202418 A1* | 8/2011 | Kempton | B60L 11/1824 705/26.1 |
| 2011/0204720 A1* | 8/2011 | Ruiz | B60L 11/1816 307/66 |
| 2011/0213983 A1* | 9/2011 | Staugaitis | B60L 11/1824 713/176 |
| 2011/0282513 A1* | 11/2011 | Son | B60L 11/1816 700/297 |
| 2011/0316478 A1* | 12/2011 | Lowenthal | G06Q 30/04 320/109 |
| 2012/0007563 A1* | 1/2012 | Muto | B60L 11/1842 320/128 |
| 2012/0035778 A1* | 2/2012 | Kong | G06Q 30/018 700/295 |
| 2012/0053742 A1* | 3/2012 | Tsuda | B60L 11/1842 700/291 |
| 2012/0053885 A1* | 3/2012 | Kato | G06F 3/1221 702/128 |
| 2012/0123604 A1* | 5/2012 | Littrell | H01M 10/44 700/295 |
| 2012/0124364 A1* | 5/2012 | Okada | H04N 9/3155 713/100 |
| 2012/0161701 A1* | 6/2012 | Kawamoto | B60L 11/1809 320/109 |
| 2012/0187913 A1* | 7/2012 | Abe | H01M 10/44 320/134 |
| 2012/0197693 A1* | 8/2012 | Karner | G06Q 20/102 705/14.1 |
| 2012/0209445 A1* | 8/2012 | Kim | H02J 3/14 700/296 |
| 2012/0215370 A1* | 8/2012 | Seo | H04L 12/12 700/296 |
| 2012/0228935 A1* | 9/2012 | Nakashima | H02J 3/32 307/24 |
| 2012/0228941 A1* | 9/2012 | Sakai | H02J 3/383 307/66 |
| 2012/0228942 A1* | 9/2012 | Nakashima | H02J 3/383 307/66 |
| 2012/0228950 A1* | 9/2012 | Sakai | H02J 3/383 307/84 |
| 2012/0286723 A1 | 11/2012 | Ukita et al. | |
| 2012/0290142 A1* | 11/2012 | Lee | H04L 12/66 700/291 |
| 2012/0304204 A1* | 11/2012 | Nishimura | H04N 21/237 725/1 |
| 2012/0310560 A1* | 12/2012 | Ozaki | G01R 22/10 702/62 |
| 2012/0323386 A1* | 12/2012 | Ito | H02J 3/32 700/291 |
| 2012/0326653 A1* | 12/2012 | Godrich | H02J 1/10 320/101 |
| 2012/0326668 A1* | 12/2012 | Ballatine | H02J 1/102 320/109 |
| 2013/0013123 A1* | 1/2013 | Ozaki | B60L 11/1842 700/295 |
| 2013/0049695 A1* | 2/2013 | Baba | H02J 3/32 320/128 |
| 2013/0054045 A1* | 2/2013 | Ramezani | B60L 11/1844 700/297 |
| 2013/0085614 A1* | 4/2013 | Wenzel | G05D 23/1923 700/277 |
| 2013/0093393 A1* | 4/2013 | Shimotani | B60L 3/12 320/109 |
| 2013/0127395 A1* | 5/2013 | Santos Silva Serra Duarte | B60L 11/1824 320/101 |
| 2013/0179061 A1* | 7/2013 | Gadh | B60L 11/1842 701/123 |
| 2013/0207607 A1* | 8/2013 | Sugiyama | B60L 11/1842 320/109 |
| 2013/0229059 A1* | 9/2013 | Baba | H02J 3/008 307/35 |
| 2013/0310999 A1* | 11/2013 | Baxter | B60L 3/0084 700/296 |
| 2013/0345888 A1* | 12/2013 | Forbes, Jr. | H02J 3/14 700/291 |
| 2013/0346768 A1* | 12/2013 | Forbes, Jr. | G06F 1/266 713/310 |
| 2014/0018969 A1* | 1/2014 | Forbes, Jr. | H02J 3/32 700/295 |
| 2014/0052310 A1* | 2/2014 | Baba | G05F 1/66 700/297 |
| 2014/0095263 A1* | 4/2014 | McAlister | G06Q 30/0206 705/7.35 |
| 2014/0114867 A1* | 4/2014 | Volkmann | G06Q 10/06 705/308 |
| 2014/0152256 A1* | 6/2014 | Lowenthal | B60L 11/1816 320/109 |
| 2014/0210412 A1* | 7/2014 | Lowenthal | B60L 11/1816 320/109 |
| 2014/0232180 A1* | 8/2014 | Kinomura | B60L 11/12 307/9.1 |
| 2014/0351010 A1* | 11/2014 | Kong | G05F 1/66 705/7.29 |
| 2015/0045962 A1* | 2/2015 | Wenzel | G05D 23/1923 700/276 |
| 2015/0061387 A1* | 3/2015 | Daniel | F03D 9/00 307/24 |
| 2015/0162764 A1* | 6/2015 | Lowenthal | G06Q 30/04 307/12 |

(56) References Cited

U.S. PATENT DOCUMENTS

| | | | |
|---|---|---|---|
| 2015/0207323 A1* | 7/2015 | Baba | H02J 3/32 |
| | | | 307/20 |
| 2016/0195888 A1* | 7/2016 | Wenzel | G05D 23/1923 |
| | | | 700/275 |
| 2017/0054296 A1* | 2/2017 | Daniel | F03D 9/00 |

FOREIGN PATENT DOCUMENTS

| | | |
|---|---|---|
| JP | 2008-141925 A | 6/2008 |
| JP | 2010-268576 A | 11/2010 |
| JP | 2011-155713 A | 8/2011 |
| JP | 2011-163858 A | 8/2011 |

OTHER PUBLICATIONS

"What Does It Take to Achieve a Net-Zero-Energy Home?", David Shepler, Huffington Post, Published online Oct. 22, 2010, Accessed Mar. 23, 2017, http://www.huffingtonpost.com/david-shepler/what-does-it-take-to-achi_b_772310.html.*

"Home: $428,000, utility bills: $0 in Dane County's first fossil-fuel-free house," Karen Rivedal, Published online May 25, 2014, Accessed Mar. 23, 2017, http://hostmadison.com/wsj/business/home-utility-bills-in-dane-county-s-first-fossil-fuel/article_599a88e0-6859-11df-a635-001cc4c03286.html.*

"Batteries in a Portable World," Isidor Buchmann, Cadex Electronics Inc., p. 19, Published 2011, print.*

Julia Layton, "How Zero-energy Homes Work" Jul. 23, 2009. HowStuffWorks.com. <https://science.howstuffworks.com/environmental/green-tech/sustainable/zero-energy-home.htm> Dec. 6, 2018.*

GridSTAR, "About GridSTAR", Penn State University, published on google Oct. 13, 2011, Accessed Dec. 6, 2018, https://smartenergyacademy.psu.edu/gridstar/about-gridstar.*

Extended European Search Report issued in European Patent Application No. 12852174.7 dated Mar. 2, 2015.

Chinese Search Report dated Oct. 26, 2015 issued in Chinese Patent Application No. 201280057254.6 (English translation).

International Search Report issued in International Application No. PCT/JP2012/007413 dated Feb. 19, 2013, with English Translation.

* cited by examiner

FIG. 6

|  | $CO_2$ EMISSION COEFFICIENT(kg-$CO_2$/kWh) |
|---|---|
| 0:00-6:00 | 0.2 |
| 6:00-20:00 | 0.5 |
| 20:00-24:00 | 0.2 |

FIG. 7

|  | NEXT-SCHEDULED TRAVEL TIME | ESTIMATED POWER CONSUMPTION (kWh) |
|---|---|---|
| 1 | 10 OCTOBER 7:30 | 7 |
| 2 | 12 OCTOBER 7:30 | 7 |
| 3 | 15 OCTOBER 7:30 | 7 |

FIG. 8

| $CO_2$ EMISSION COUNTER |
|---|
| 8.4 |

ELECTRICITY MANAGEMENT DEVICE, ELECTRICITY MANAGEMENT METHOD, AND ELECTRICITY DISTRIBUTION SYSTEM INSIDE A HOUSE WITH ELECTRICITY GENERATING DEVICE, UTILITY GRID CONNECTION, AND ELECTRIC VEHICLE CONTAINING A RECHARGEABLE BATTERY IN A VEHICLE-TO-GRID CONNECTION WITH COUNTER DEVICE

RELATED APPLICATIONS

This application is the U.S. National Phase under 35 U.S.C. § 371 of International Application No. PCT/JP2012/007413, filed on Nov. 19, 2012, which in turn claims the benefit of Japanese Application No. 2011-254883 filed on Nov. 22, 2011, the disclosures of which Applications are incorporated by reference herein.

TECHNICAL FIELD

The present invention relates to an electricity management device, an electricity management program, and an electricity distribution system which manage electricity used in a house and an electric vehicle.

BACKGROUND ART

One of known home systems provided with solar cells is an invention described in Patent Literature 1, for example. Patent Literature 1 describes about the following operation. The home system calculates an amount of photovoltaic electricity predicted and an amount of charging electricity predicted for a vehicle rechargeable battery and supplies the photovoltaic electricity to the vehicle rechargeable battery if the rechargeable battery needs to be charged. When the amount of photovoltaic electricity predicted is larger than the amount of charge predicted, the home system supplies the surplus electricity to house loads. When the amount of photovoltaic power predicted is larger than the sum of the amount of charge predicted and the house loads, the home system supplies the surplus electricity to a house-side rechargeable battery. When there is still surplus electricity, the surplus electricity can be sold.

However, the solar cells are not always generating enough electricity when the electric vehicle is connected to a charger. Accordingly, the vehicle battery is sometimes charged from the grid power. In order to avoid charging from the grid power, in Patent Literature 1, the rechargeable battery is provided for the house. The house-side rechargeable battery is temporarily charged from electricity generated by the solar cells, and then the rechargeable battery of the electric vehicle connected to the charger is charged from electricity discharged from the house rechargeable battery.

However, in the method of providing a rechargeable battery for the house side as described in Patent Literature 1, it is necessary to install an expensive rechargeable battery in addition to that in the electric vehicle.

The present invention was proposed in the light of the aforementioned circumstances, and an object of the present invention is to provide an electricity management apparatus, an electricity management program, and an electricity distribution system which are capable of charging an electric vehicle substantially without using grid power.

CITATION LIST

Patent Literature

Patent Literature 1: Japanese Patent Laid-open Publication No. 2010-268576

SUMMARY OF INVENTION

An electricity management device according to a first aspect of the present invention includes: a charging electricity accumulator which increases a counter value as a rechargeable battery of an electric vehicle is charged from grid power that is supplied from an electrical grid and retains the counter value when the rechargeable battery of the electric vehicle is charged from electricity that is generated by a electricity generation device in a house; and a discharging electricity accumulator which reduces the counter value as electricity in the rechargeable battery of the electric vehicle is discharged into the house.

In the electricity management device according to the first aspect, an electricity management device according to a second aspect of the present invention further includes a controller which performs control so that the electricity in the rechargeable battery of the electric vehicle is discharged into the house until the counter value becomes a predetermined target value.

In the electricity management device according to the second aspect of the present invention, an electricity management device according to a third aspect of the present invention is characterized in that: the predetermined target value is set to 0, and the controller performs control so that the electricity in the rechargeable battery of the electric vehicle is discharged into the house until the counter value becomes 0.

In the electricity management device according to the second aspect of the present invention, an electricity management device according to a fourth aspect of the present invention is characterized by further including: a travel distance acquisition unit acquiring travel distance of the electric vehicle, in which a carbon dioxide emission coefficient and a counter target value are previously set, the carbon dioxide emission coefficient indicating an amount of carbon dioxide emissions per unit of the grid power, and the counter target value corresponding to an amount of carbon dioxide emissions per unit of the travel distance by the electric vehicle, and the charging electricity accumulator adds a value to the counter value, the added value is obtained by multiplying the amount of charging electricity of the rechargeable battery of the electric vehicle from the grid power by the carbon dioxide emission coefficient and dividing the obtained product by the travel distance acquired by the travel distance acquisition unit, and the controller performs control so that the electricity in the rechargeable battery of the electric vehicle is discharged into the house until the counter value becomes the counter target value corresponding to the amount of carbon dioxide emissions per unit of the travel distance of the electric vehicle.

In the electricity management device according to the second aspect of the present invention, an electricity management device according to a fifth aspect of the present invention is characterized in that: the controller estimates an amount of electricity generated by the electricity generation device on the next day and an electricity demand of the house on the next day, and the controller performs control so that the electricity in the rechargeable battery of the electric vehicle is discharged into the house only when it is predicted that the rechargeable battery of the electric vehicle can be fully charged.

In the electricity management device according to the fifth aspect of the present invention, an electricity management device according to a sixth aspect of the present invention is characterized in that: the controller sets the upper limit of the amount of electricity discharged from the rechargeable battery of the electric vehicle into the house to an amount of surplus electricity which is obtained by subtracting the estimated electricity demand of the house of the next day from the estimated amount of electricity generated by the electricity generation device on the next day.

In the electricity management device according to the fifth or sixth aspect of the present invention, an electricity management device according to a seventh aspect of the present invention is characterized in that: the carbon dioxide emission coefficient indicating an amount of carbon dioxide emissions per unit of the grid power is previously set; and the counter value is set to the amount of carbon dioxide emissions which is obtained by multiplying the carbon dioxide emission coefficient by the amount of charging electricity and the amount of electricity discharged.

In the electricity management device according to the fifth or sixth aspect of the present invention, an electricity management device according to an eighth aspect of the present invention is characterized in that: an electricity buying price coefficient and an electricity selling price coefficient are previously set, the electricity buying price coefficient indicating electricity buying price per unit of the grid power, the electricity selling price coefficient indicating an electricity selling price per unit of the electricity generated by the power generation device; as the rechargeable battery of the electric vehicle is charged from the generated electricity, the amount of electricity generated is multiplied by the electricity selling price coefficient to be added to the counter value; and as the rechargeable battery of the electric vehicle is charged from the grid power, the amount of grid power is multiplied by the electricity buying price coefficient to be added to the counter value.

In the electricity management device according to the first aspect of the present invention, an electricity management device according to a ninth aspect of the present invention is characterized by further comprising: a display unit displaying the counter value or information corresponding to the counter value.

In the electricity management device according to the first aspect of the present invention, an electricity management device according to a tenth aspect of the present invention is characterized in that: the charging electricity accumulator increases the counter value in accordance with the amount of charging electricity for a plurality of electric vehicles; and the discharging electricity accumulator reduces the counter value in accordance with the amount of electricity discharged by the plurality of electric vehicles.

An electricity management method according to an eleventh aspect of the present invention includes: increasing a counter value as a rechargeable battery of an electric vehicle is charged from grid power that is supplied from an electrical grid and retaining the counter value when the rechargeable battery of the electric vehicle is charged by electricity that is generated by an electricity generation device in a house; and reducing the counter value as electricity in the rechargeable battery of the electric vehicle is discharged into the house.

An electricity distribution system according to a twelfth aspect of the present invention includes: an electricity generator generating electricity; an electricity distribution unit distributing the electricity generated by the electricity generator, grid power supplied from an electrical grid, and charging/discharging electricity of a rechargeable battery of an electric vehicle; a electricity management unit including: a charging electricity accumulator which increases a counter value as a rechargeable battery of an electric vehicle is charged from grid power that is supplied from an electrical grid and retains the counter value when the rechargeable battery of the electric vehicle is charged by electricity that is generated by the electricity generator; and a discharging electricity accumulator which reduces the counter value as electricity in the rechargeable battery of the electric vehicle is discharged; and a controller controlling the operation of the electricity distribution unit based on the counter value calculated by the electricity management unit.

BRIEF DESCRIPTION OF DRAWINGS

FIG. 6 is a table showing $CO_2$ emission coefficients in the electricity distribution system as the embodiment of the present invention.

FIG. 7 is a table showing the date and time of next-scheduled travel in the electricity distribution system as the embodiment of the present invention.

FIG. 8 is a table showing a $CO_2$ emission counter in the electricity distribution system as the embodiment of the present invention.

DESCRIPTION OF EMBODIMENTS

Hereinafter, a description is given of an embodiment of the present invention with reference to the drawings.

Figure 1:
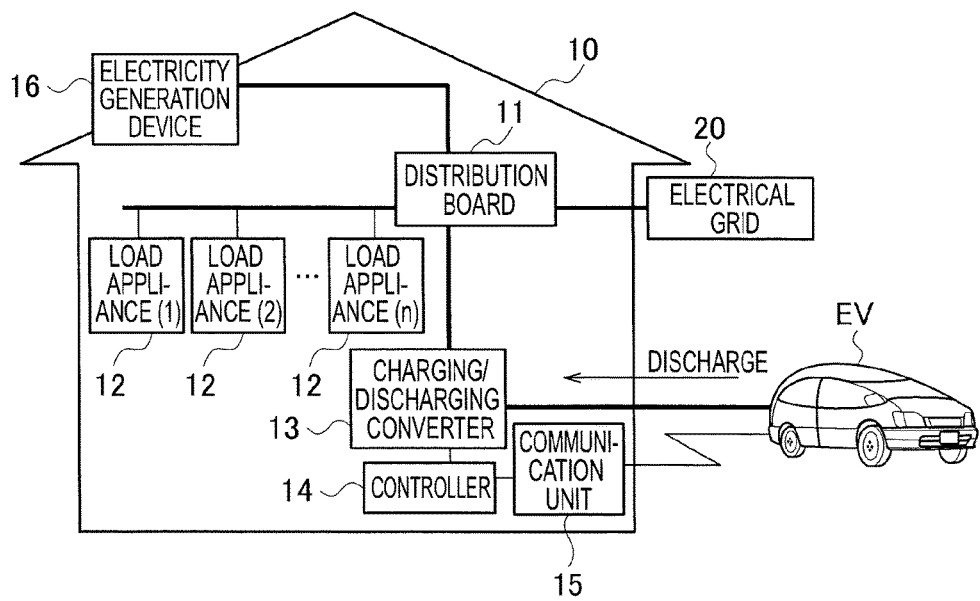
FIG. 1 is a block diagram illustrating the configuration of an electricity distribution system as an embodiment of the present invention.

An electricity distribution system shown as an embodiment of the present invention is configured as illustrated in FIG. 1, for example. This electricity distribution system is focused on the fact that an electric vehicle EV does not emit carbon dioxide ($CO_2$) when traveling but actually emits $CO_2$ when being charged by a grid power supply. The electricity distribution system performs charging from solar cells in preference to charging from the grid power supply, which is used to make up the shortage. After charging the electric vehicle EV from the grid power supply, the electricity distribution system then discharges the electricity supplied from the solar cells to the house. The electricity distribution system thus substantially controls the balance of $CO_2$ emissions to zero (+/−0).

In this electricity distribution system, a house 10 connected to an electrical grid 20 and the electric vehicle EV can be connected with a power line. In the house 10, a distribution board 11, plural load appliances 12 (1 to n), a charging/discharging converter 13, an electricity management device 14, a communication unit 15, and a electricity generation device 16 are provided.

The charging/discharging converter 13 is electrically connected to the electric vehicle EV through a power cable. The charging/discharging converter 13 exchanges electricity with the electric vehicle EV in accordance with control of the electricity management device 14 when being connected to the electric vehicle EV. The charging/discharging converter 13 includes a DC-DC conversion circuit and an AC-DC conversion circuit. The charging/discharging converter 13 performs AC/DC conversion between voltage appropriate for the house 10 and voltage appropriate for a rechargeable battery of the electric vehicle EV. The voltage appropriate for the house 10 is an alternating-current voltage of 100 V, for example. The voltage appropriate for charging/discharging of the rechargeable battery of the electric vehicle EV is a direct-current voltage of 300 to 400 V, for example.

The distribution board 11 is connected to the load appliances 12, charging/discharging converter 13, electricity generation device 16, and electrical grid 20. The distribution board 11 includes a branch circuit, relays, breakers, and the like. The distribution board 11 distributes the grid power supplied from the electrical grid 20 to the load appliances 12. The distribution board 11 supplies electricity to the charging/discharging converter 13 in the process of charging the rechargeable battery of the electric vehicle EV. Furthermore, when the electricity discharged from the rechargeable battery of the electric vehicle EV is supplied through the charging/discharging converter 13, the distribution board 11 distributes the electricity discharged from the rechargeable battery into the load appliances 12 and the like. Furthermore, when electricity is generated by the electricity generation device 16, the distribution board 11 can distribute the generated electricity to the load appliances 12 and charging/discharging converter 13. The distribution board 11 may be configured to either supply or not supply the electricity generated by the electricity generation device 16 to the electrical grid 20.

The load appliances 12 include various house appliances in the house 10.

The communication unit 15 is connected to the electricity management device 14 and the electric vehicle EV. The communication unit 15 exchanges information between the electric vehicle EV and the house 10.

The electricity management device 14 manages electricity exchanged between the load appliances 12, electricity generation device 16, electrical grid 20, and electric vehicle EV.

The electricity management device 14, in particular, adds the amount of grid power supplied from the electrical grid 20 to the electric vehicle EV and subtracts the amount of electricity discharged from the electric vehicle EV to adjust a counter value (a $CO_2$ emission counter value) of the electric vehicle EV to 0.

Figure 2:
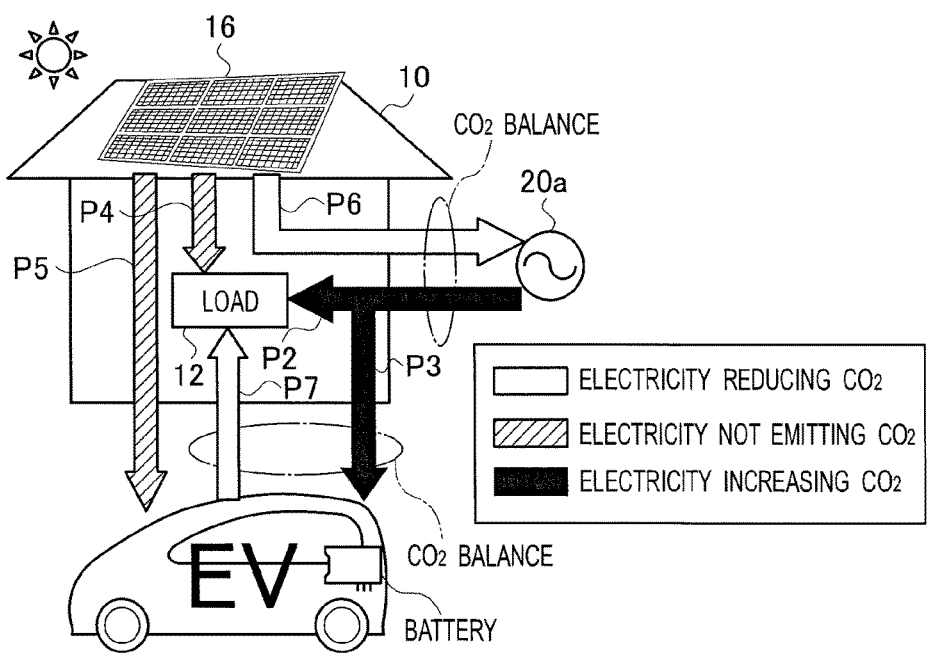
FIG. 2 is a block diagram showing electricity distribution in the electricity distribution system as the embodiment of the present invention.

As illustrated in FIG. 2, the house 10 is connected to a grid power supply 20a and is supplied with grid power P1 supplied from the grid power supply 20a. The grid power P1 is distributed by the distribution board 11 as power P2 for the load appliances 12 and power P3 for the electric vehicle EV. As for the electricity supplied from the grid power supply 20a, the counter value is increased by the amount of carbon dioxide ($CO_2$) produced by operation of the electrical grid 20.

The electricity generated by the electricity generation device 16 of the house 10 is distributed by the distribution board 11 as electricity P4 for the load appliances 12 and electricity P5 for the electric vehicle EV. As for the electricity generated by the electricity generation device 16, the generation process thereof does not produce $CO_2$, and the counter value does not change.

Electricity P6 which is a part of the electricity generated by the electricity generation device 16 separated at the distribution board 11 to be supplied (sold) to the electrical grid 20 from the house 10. The electricity supplied to the electrical grid 20 reduces production of $CO_2$ in the electrical grid 20, and the amount thereof can be subtracted from the counter value.

Furthermore, electricity P7 discharged from the electric vehicle EV to the load appliances 12 in the house 10 can reduce the electricity required for the house 10 and thereby reduce the electricity P3 from the electrical grid 20, thus reducing production of $CO_2$ in the electrical grid 20. Accordingly, the amount of electricity P7 can be subtracted from the counter value.

The thus-configured electricity distribution system controls the electricity exchanged between the house 10 and electric vehicle EV to adjust the $CO_2$ emission counter value corresponding to the exchanged electricity (a controller). The electricity distribution system performs control so that the electricity in the rechargeable battery of the electric vehicle EV is discharged to the house 10 until the $CO_2$ emission counter value becomes a predetermined target value.

The electricity management device 14 may be configured to set the predetermined target value of the $CO_2$ emission counter value to 0. In this case, the electricity management device 14 performs control so that the electricity in the rechargeable battery of the electric vehicle EV is discharged to the house until the $CO_2$ emission counter value becomes 0. Alternatively, the electricity management device 14 may be configured to discharge the rechargeable battery of the electric vehicle EV until the $CO_2$ emissions of the electric vehicle EV per a travel distance of 1 km as the counter value becomes a predetermined target value.

Figure 3:
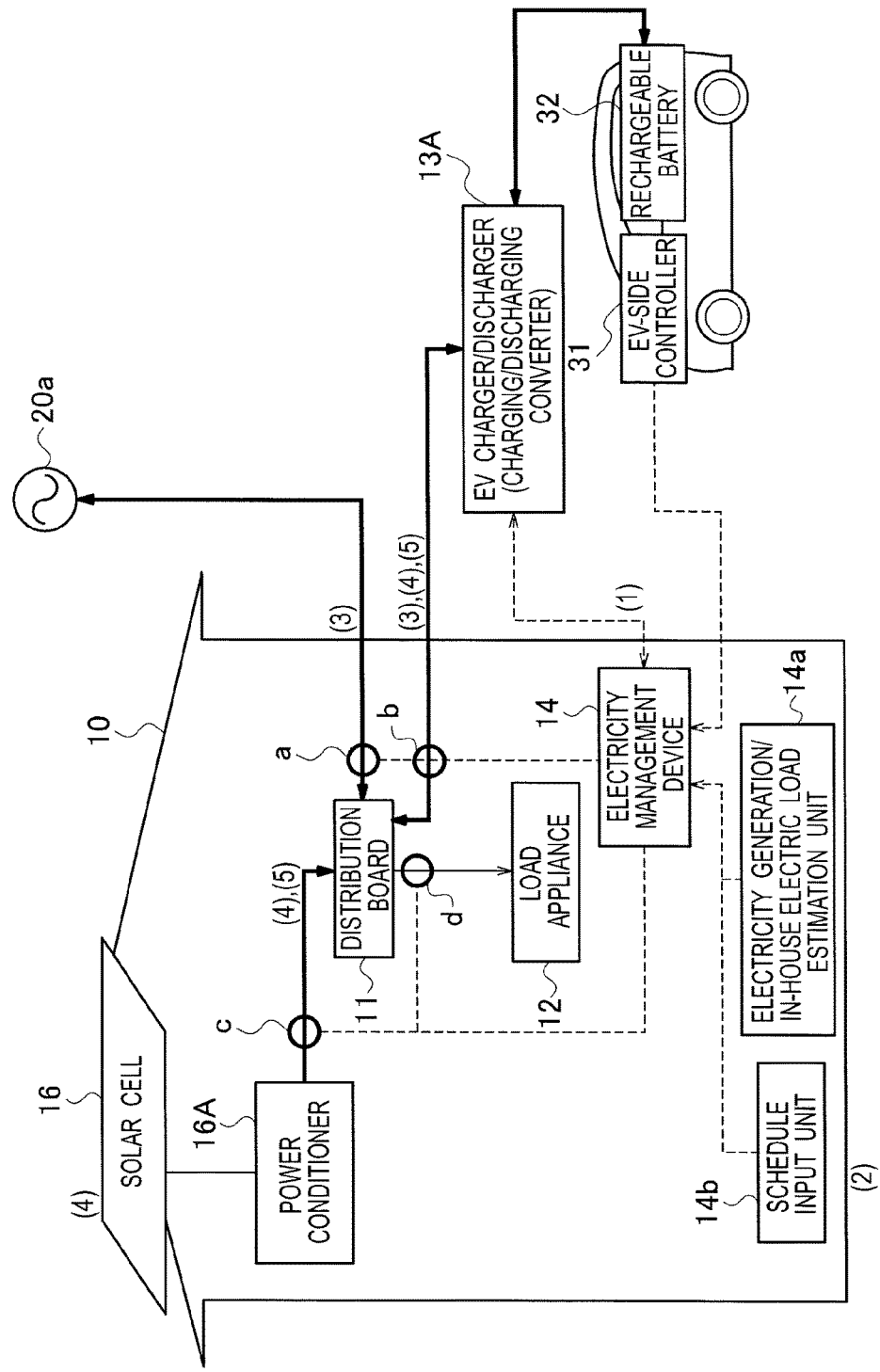
FIG. 3 is a block diagram illustrating the functional configuration of the electricity distribution system as the embodiment of the present invention.

The specific configuration and operation of the electricity distribution system are illustrated in FIG. 3.

In the electricity distribution system shown in FIG. 3, when the electric vehicle EV enters a parking space of the house 10, the electric vehicle EV is connected to an EV charger/discharger 13A for charging a rechargeable battery 32 of the electric vehicle EV. The EV charger/discharger 13A includes the same function as the aforementioned charging/discharging converter 13. The EV charger/discharger 13A is composed of the EV charger/discharger 13A which is separate from the house 10 but may be installed in the house 10 in a similar manner to the charging/discharging converter 13. In this state, the house 10 and electric vehicle EV can exchange information via communication cable or by wireless communication.

In response to the entry of the electric vehicle EV, the EV charger/discharger 13A supplies to the electricity management device 14, connection information representing that the connection with the electric vehicle EV is "on state" (operation (1): entry to the parking space). The electric vehicle EV sends rechargeable battery information to the electricity management device 14 through an EV-side controller 31. The rechargeable battery information includes remaining battery power of the rechargeable battery 32 and the amount of electricity stored outside. The remaining battery power of the rechargeable battery 32 is a charge level (SOC: stat of charge, for example.), for example. The amount of electricity stored outside is an amount of electricity which is stored at a not-shown charging station or the like.

In the electricity distribution system, a usage schedule of the electric vehicle EV is registered through a schedule input unit 14b (operation (2): registration). The usage schedule of the electric vehicle EV includes date and time when the electric vehicle EV is scheduled to be used next time. The schedule input unit 14b may be composed of a touch panel serving as an interphone, various remote controllers, a mobile phone, or an operation panel, which are operated by the user. The schedule input unit 14b may be configured to estimate the usage pattern of the electric vehicle EV based on user's usage history of the electric vehicle EV.

Based on the connection information and rechargeable battery information acquired in the operation (1) and the usage schedule of the electric vehicle EV inputted in the operation (2), the electricity management device 14 performs a charging operation for the rechargeable battery 32 of the electric vehicle EV (operation (3): charging, operation (4): charging from surplus electricity) or a discharging operation for the same (operation (5): discharging electricity to the house).

When the electric vehicle EV is scheduled to travel the next day, for example, the electricity management device 14 extracts charging electricity a from the grid power supply 20a and charges the rechargeable battery 32 from the charging electricity a (operation (3): charging). When there is a surplus electricity c by electricity generation of the electricity generation device 16, the electricity management device 14 charges the rechargeable battery 32 of the electric vehicle EV from the surplus electricity through a power conditioner 16A (operation (4): charging from surplus electricity). In this process, the electricity management device 14 increases the $CO_2$ emission counter value.

When the electricity EV is not scheduled to travel the next day, for example, the electricity management device 14 supplies to the house 10, the electricity b discharged from the rechargeable battery 32 of the electric vehicle EV. In this process, the electricity management device 14 reduces the $CO_2$ emission counter value.

Figure 4:
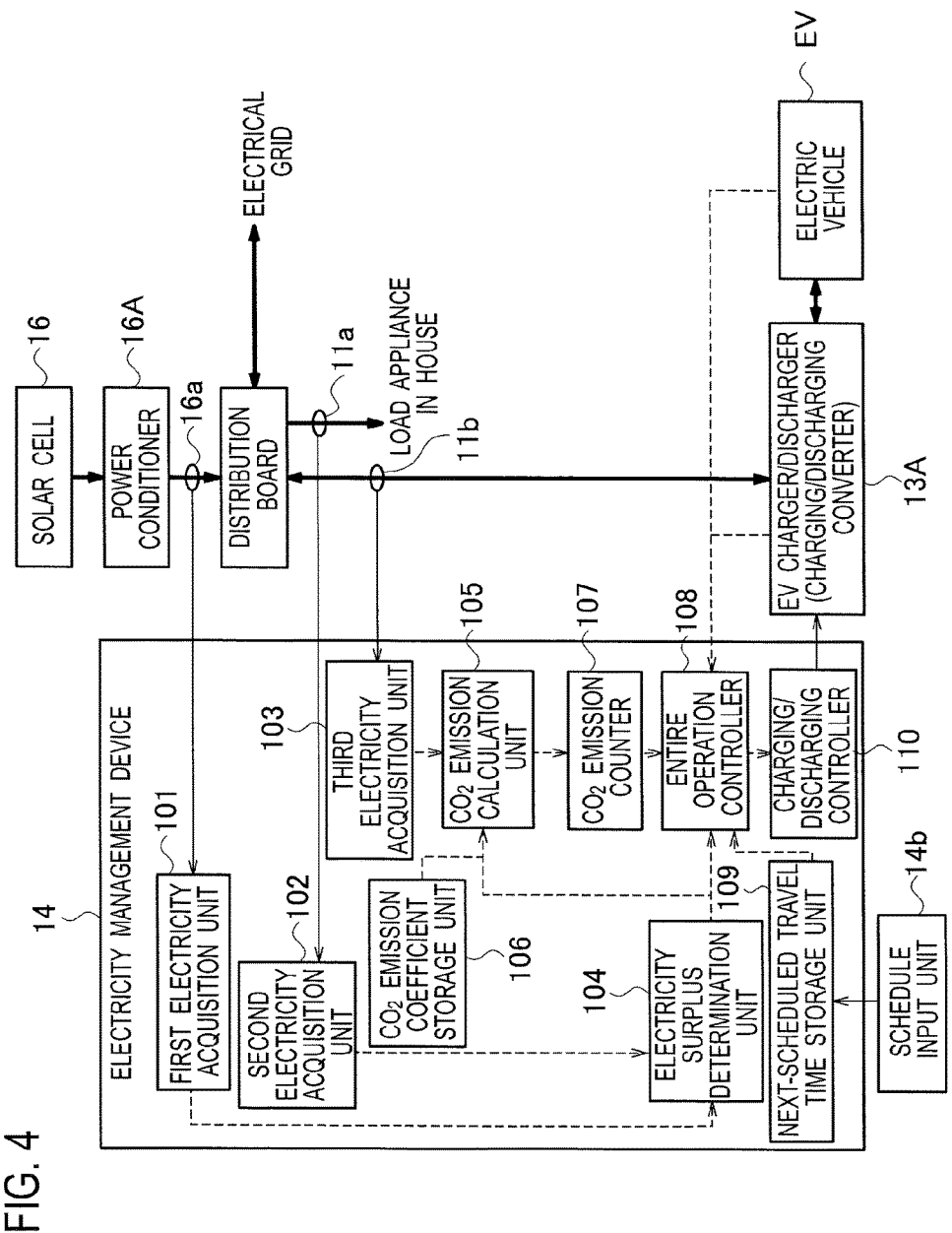
FIG. 4 is a block diagram illustrating the functional configuration of an electricity management device in the electricity distribution system as the embodiment of the present invention.

The electricity management device 14 has a functional configuration illustrated in FIG. 4. The electricity management device 14 includes a first electricity acquisition unit 101, a second electricity acquisition unit 102, a third electricity acquisition unit 103, and a surplus electricity determination unit 104. The electricity management device 14 further includes a $CO_2$ emission calculation unit 105, a $CO_2$ emission coefficient storage unit 106, a $CO_2$ emission counter 107, an entire operation controller 108, a next-scheduled travel time storage unit 109, and a charging/discharging controller 110. The electricity management device 14 is a computer including a storage unit, a communication I/F circuit, a CPU, and a program, and the CPU executes the program. The program of the electricity management device 14 causes the computer of the electricity management device 14 to execute a procedure of managing electricity and the balance of $CO_2$ emissions as described later.

The first electricity acquisition unit 101 is connected to an in-house electricity generation sensor 16a provided between the power conditioner 16A and the distribution board 11. The first electricity acquisition unit 101 is configured to acquire the amount of electricity generated by the electricity generation device 16.

The second electricity acquisition unit 102 is connected to a house electricity consumption sensor 11a provided between the distribution board 11 and the load appliances 12. The second electricity acquisition unit 102 acquires an amount of electricity used which is extracted from the distribution board 11 to the load appliances 12.

The third electricity acquisition unit 103 is connected to a charging/discharging electricity sensor 11b which is provided between the distribution board 11 and the EV charger/discharger 13A. The third electricity acquisition unit 103 acquires the amount of charging/discharging electricity exchanged between the distribution board 11 and EV charger/discharger 13A.

The surplus electricity determination unit 104 is configured to calculate the difference between the amount of PV-generated electricity, which is acquired by the first electricity acquisition unit 101, and the amount of in-house power consumption, which is acquired by the second electricity acquisition unit 102, and judges the amount of surplus electricity.

The $CO_2$ emission calculation unit 105 is configured to calculate the amount of $CO_2$ emissions of the electric vehicle EV based on the amount of charging/discharging electricity, which is acquired by the third electricity acquisition unit 103. The $CO_2$ emission calculation unit 105 calculates the amount of $CO_2$ emissions by multiplying the amount of charging/discharging electricity by a $CO_2$ emission coefficient which is stored in the $CO_2$ emission coefficient storage unit 106.

The $CO_2$ emission coefficient is $CO_2$ emissions (kg) per electricity of 1 kWh. This $CO_2$ emission coefficient varies on the time of day when electricity is generated by the electrical grid 20. The $CO_2$ emission coefficient is set to a value of 0.2 or 0.5, for example.

When the grid power is supplied from the distribution board 11 to the charging/discharging converter 13, the $CO_2$ emission calculation unit 105 increases the amount of $CO_2$ emissions of the electric vehicle EV in accordance with the amount of grid power supplied. In this process, the $CO_2$ emission calculation unit 105 causes the $CO_2$ emission counter 107 to increase the $CO_2$ emission counter value.

On the other hand, when the electricity discharged from the electric vehicle EV is supplied from the EV charger/discharger 13A to the distribution board 11, the $CO_2$ emission calculation unit 105 reduces the amount of $CO_2$ emissions of the electric vehicle EV in accordance with the amount of electricity discharged. In this process, the $CO_2$ emission calculation unit 105 causes the $CO_2$ emission counter 107 to reduce the $CO_2$ emission counter value.

Furthermore, the $CO_2$ emission calculation unit 105 is supplied with the amount of surplus electricity from the surplus electricity determination unit 104. When the surplus electricity is supplied from the distribution board 11 to the EV charger/discharger 13A to charge the electric vehicle EV, the electrical grid 20 does not emit $CO_2$. Accordingly, when the electric vehicle EV is being charged from the surplus electricity, the $CO_2$ emission calculation unit 105 does not increase the amount of $CO_2$ emissions. The $CO_2$ emission counter 107 does not increase the $CO_2$ emission counter value.

The $CO_2$ emission calculation unit 105, $CO_2$ emission coefficient storage unit 106, $CO_2$ emission counter 107 function as a charging electricity accumulator and a discharging electricity accumulator.

The entire operation controller 108 controls the entire charging and discharging operation by the electricity distribution system. The entire operation controller 108 performs the operation shown in a later-described flowchart to control charging and discharging so that the balance of $CO_2$ emissions becomes the predetermined target value.

The electricity distribution system may include a display unit displaying the $CO_2$ emission counter value or the amount of $CO_2$ emissions or electricity corresponding to the $CO_2$ emission counter value. The information concerning the $CO_2$ emissions can be presented to the user.

The next-scheduled travel time storage unit 109 receives and stores the date and time of the next-scheduled travel from the schedule input unit 14b. From the next-scheduled travel time storage unit 109, next-scheduled travel time information is read in accordance with the control of the entire operation controller 108.

The charging/discharging controller 110 supplies a charging/discharging control signal to the EV charger/discharger 13A in accordance with the control by the entire operation controller 108.

Figure 5:
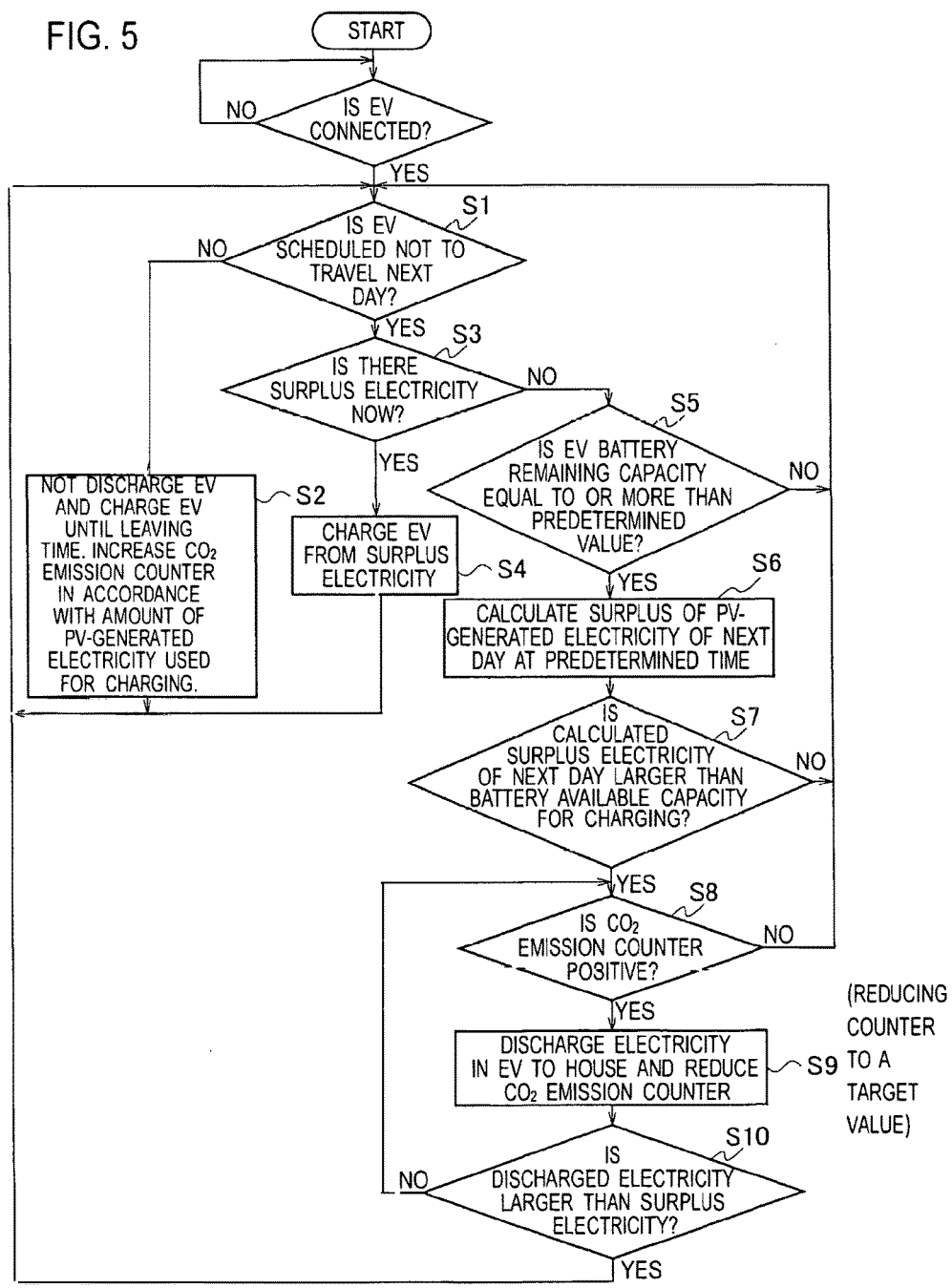
FIG. 5 is a flowchart showing the operation of the electricity distribution system as the embodiment of the present invention.

Next, with reference to the flowchart of FIG. 5, a description is given of the procedure of the aforementioned operation of the electricity management device 14 to control charging/discharging so that the balance of $CO_2$ emissions of the electric vehicle EV becomes the predetermined target value. It is assumed in this operation that the $CO_2$ emission coefficient shown in FIG. 6, the date and time of next-scheduled travel shown in FIG. 7, and the $CO_2$ emission counter value shown in FIG. 8 are set.

This operation starts from step S1 in response to detection of connection of the electric vehicle EV to the house 10. In the step S1, the electricity management device 14 determines through the entire operation controller 108 whether the electric vehicle EV is scheduled not to travel the next day. When the electric vehicle EV is scheduled to travel the next day, the process goes to step S2, and otherwise, the process goes to step S3. In this process, the entire operation controller 108 reads the date and time of the next-scheduled travel which are stored in the next-scheduled travel time storage unit 109 through an input at the schedule input unit 14b. The date and time of the next-scheduled travel is set as shown in FIG. 7, for example.

Normally, the time of day when the rechargeable battery 32 of the electric vehicle EV which cannot be charged from surplus electricity generated by the electricity generation device 16 can be charged from grid power is previously determined. The traveling the next day in the step S1 means that the normal charging hours is included in the period between the current time and the time of the next-scheduled travel and the electric vehicle EV leaves the parking space after the end of the normal charging hours.

In the next step S2, the electric vehicle EV is not discharged, and the rechargeable battery 32 of the electric vehicle EV is charged to a predetermined target value by the leaving time of the electric vehicle EV. In this process, the charging/discharging controller 110 supplies to the EV charger/discharger 13A, the charging/discharging control signal to charge the electric vehicle EV. The EV charger/discharger 13A extracts grid power from the distribution board 11 in response to the charging/discharging control signal and supplies the same to the electric vehicle EV. Moreover, the charging/discharging controller 110 calculates the amount of surplus electricity by subtracting the amount of in-house power consumption from the amount of PV-generated electricity. When the amount of surplus electricity is short of the amount of electricity needed to charge the electric vehicle EV, the grid power is supplied to the EV charger/discharger 13A from the distribution board 11.

In this process, the third electricity acquisition unit 103 detects the amount of charging/discharging electricity supplied from the distribution board 11 to the EV charger/discharger 13A with the charging/discharging electricity sensor 11b. The $CO_2$ emission calculation unit 105 calculates the amount of $CO_2$ emissions by multiplying the detected amount of charging/discharging electricity by the $CO_2$ emission coefficient and increases the $CO_2$ emission counter value of the $CO_2$ emission counter 107. As for the $CO_2$ emission coefficient, a table shown in FIG. 6 is stored in the $CO_2$ emission coefficient storage unit 106, for example. The $CO_2$ emission counter 107 stores a value shown in FIG. 8.

In the step S2, if the electric vehicle EV can be charged within the normal charging hours by the leaving time of the electric vehicle EV, the electric vehicle EV is caused to stand-by until the starting time of the normal charging hours and is then charged. When the charging of the electric vehicle EV cannot be completed until the electric vehicle EV leaves the parking space, the charge may be started before the starting time of the normal charging hours. In this process, the charging electricity is from grid power. Accordingly, the $CO_2$ emission calculation unit 105 calculates the amount of $CO_2$ emissions by multiplying the $CO_2$ emission coefficient by the amount of charging electricity that is acquired by the third electricity acquisition unit 103 and adds the calculated amount of $CO_2$ emissions to the $CO_2$ emission counter value.

In the step S2, the electricity management device 14 may be configured to estimate the surplus by in-house electricity generation in a period until the leaving time of the electric vehicle EV and make a charging schedule so that the electric vehicle EV is charged from the PV-generated electricity as much as possible. The entire operation controller 108 therefore includes another function as a power generation/in-house electric load estimation unit 14a which estimates the amount of PV-generated electricity and the amount of in-house power consumption.

Furthermore, in the step S2, in the case where the rechargeable battery 32 of the electric vehicle EV is being charged from grid power while the electricity generation device 16 is generating electricity, the grid power can be used to only cover the difference between the amount of charging electricity and the amount of PV-generated electricity. In this process, the electricity management device 14 calculates the amount of $CO_2$ emissions and updates the $CO_2$ emission counter value by assuming that only the amount of $CO_2$ emissions from the electric vehicle EV corresponds to the consumption of grid power.

In step S3, the entire operation controller 108 determines whether there is a surplus in PV-generated electricity now, based on the amount of surplus electricity supplied from the surplus electricity determination unit 104. The surplus of PV-generated electricity is determined by the surplus electricity determination unit 104 based on the difference between the amount of PV-generated electricity acquired by the first electricity acquisition unit 101 and the amount of in-house power consumption detected by the second electricity acquisition unit 102.

The surplus electricity determination unit 104 determines that there is a surplus of PV-generated electricity when the electricity generation device 16 is generating electricity and the amount of PV-generated electricity is larger than the power consumption of the load appliances 12 in the house 10. On the other hand, the surplus electricity determination unit 104 determines that there is no surplus of PV-generated electricity when the electricity generation device 16 is not generating electricity and when the amount of PV-generated electricity is smaller than the power consumption of the load appliances 12 in the house 10. When there is a surplus of PV-generated electricity, the process goes to step S4, and when there is no surplus of PV-generated electricity, the process goes to step S5.

In the step S4, the electric vehicle EV is charged from the same amount of electricity as the surplus of PV-generated electricity. In this process, the charging/discharging controller 110 supplies to the EC charger/discharger 13A, the charging/discharging control signal to charge the electric vehicle EV from the surplus of PV-generated electricity. The EV charger/discharger 13A extracts the surplus of PV-generated electricity from the distribution board 11 for charging the electric vehicle EV from the same. In this process, the electricity management device 14 does not update the $CO_2$ emission counter value because the grid power is not used and the electric vehicle EV is not discharging.

Steps S5 to S10 are to perform an operation of reducing the amount of $CO_2$ emissions corresponding to the electricity consumed by the electric vehicle EV at the process of discharging the rechargeable battery 32 of the electric vehicle EV.

In the step S5, the entire operation controller 108 determines whether the amount of remaining battery power of the electric vehicle EV is equal to or more than a predetermine value. The predetermined value for the amount of remaining battery power of the electric vehicle EV is set to such a value that allows the electric vehicle EV to travel even when the user uses the electric vehicle EV suddenly because of a schedule change.

In this process, the entire operation controller 108 acquires the amount of remaining battery power as the rechargeable battery information from the electric vehicle EV. When the amount of remaining battery power is not less than the predetermined value, the process goes to the step S6, and otherwise, returns to the step S1, in which the rechargeable battery 32 of the electric vehicle EV is not charged or discharged.

In the step S6, the electricity management device 14 calculates an amount of surplus of PV-generated electricity of the next day at a predetermined time. In this process, the power generation/house electric load estimation unit 14a estimates the amount of PV-generated electricity by the electricity generation device 16 and the amount of in-house power consumption. The entire operation controller 108 subtracts the estimated amount of in-house power consumption from the estimated amount of PV-generated electricity to calculate the amount of surplus of PV-generated electricity.

In this process, the power generation/house's electric load estimation unit 14a acquires weather forecast from the outside while always referring to the amount of actual PV-generated electricity generated by the electricity generation device 16 and the amount of actual in-house power consumption and then outputs time-series information of each estimated amount.

In the next step S7, the entire operation controller 108 determines whether the amount of surplus electricity of the next day, which is calculated in the step S6, is larger than the remaining capacity of the rechargeable battery 32 of the electric vehicle EV. It is therefore determined whether all of the surplus electricity generated in the next day can be used to charge the electric vehicle EV. When the remaining capacity of the rechargeable battery 32 of the electric vehicle EV is smaller, the process goes to the step S8, and otherwise, the discharging of the electric vehicle EV is not performed.

In the step S8, the entire operation controller 108 refers to the $CO_2$ emission counter 107 and determines whether the $CO_2$ emission counter value is positive. It is then determined whether to discharge the electric vehicle EV. When the $CO_2$ emission counter value is positive, the process proceeds to step S9, and otherwise, discharging of the electric vehicle EV is not performed.

In the step S9, the entire operation controller 108 performs discharging from the electric vehicle EV to the house 10 and reduces the $CO_2$ emission counter value. In this process, the entire operation controller 108 controls the charging/discharging controller 110 and causes the charging/discharging controller 110 to output to the EV charger/discharger 13A, the charging/discharging control signal to discharge the electric vehicle EV. In response to this signal, the EV charger/discharger 13A discharges the electricity in the rechargeable battery 32 of the electric vehicle EV and supplies the discharged electricity to the distribution board 11. Moreover, the third electricity acquisition unit 103 acquires the amount of discharging electricity from the EV charger/discharger 13A to the distribution board 11 through the charging/discharging electricity sensor 11b. The $CO_2$ emission calculation unit 105 multiplies the amount of electricity discharged by the $CO_2$ emission coefficient to calculate the amount of reduction in $CO_2$ emissions and subtracts the same from the $CO_2$ emission counter value.

In next step S10, the electricity management device 14 determines whether the amount of discharging electricity from the rechargeable battery 32 of the electric vehicle EV to the house 10 reaches the amount of surplus electricity calculated in the step S6 or more. When the amount of discharging electricity from the electric vehicle EV does not reach the amount of surplus electricity or more, the operation from the step S8 is repeated. When the amount of discharging electricity from the electric vehicle EV reaches the amount of surplus electricity or more, the discharging of the rechargeable battery 32 of the electric vehicle EV is stopped, and the process is returned to the step S1. The upper limit of the amount of discharging electricity from the electric vehicle EV is therefore set to the amount of surplus of PV-generated electricity. When the $CO_2$ emission counter value becomes 0 by the discharging of the electric vehicle EV, the process is returned from the step S8 to the step S1, and the discharging from the electric vehicle EV is stopped.

In the step S7, the determination is performed based on the amount of surplus electricity of the next day. However, the amount of surplus electricity may be calculated over multiple dates until the next-scheduled travel time. In this case, the power generation/house's electric load estimation unit 14a calculates the amount of surplus electricity over multiple dates until the next-scheduled travel time. When it is determined that the rechargeable battery 32 of the electric vehicle EV can be fully charged, the electric vehicle EV may be discharged even if the remaining battery power is less than the predetermined target value. Discharging the electric vehicle EV in the evening of a day when the amount of PV-generated electricity is small (cloudy day), for example, has an effect on reducing the peak consumption of grid power. Such a control may be performed in accordance with an instruction from an external grid power monitoring system.

The control in the aforementioned operation may be performed based on just the amount of electricity instead of the amount of $CO_2$ emissions. This is because adjusting the balance of $CO_2$ emissions to 0 has the same effect as adjusting the balance of electricity to 0 when the $CO_2$ emission coefficient does not vary on the time of day.

As described above, according to the electricity distribution system, the $CO_2$ emission counter value is increased as the electric vehicle EV is charged from the grid power supplied from the electrical grid as executed in the step S2. Moreover, the electricity distribution system retains the $CO_2$ emission counter value when the electric vehicle EV is charged by the PV-generated electricity from the house 10 as executed in the step S4. The charging electricity accumulator is thus implemented. Furthermore, according to the electricity distribution system, the discharging electricity accumulator which reduces the $CO_2$ emission counter value as the electricity in the electric vehicle EV is discharged to the house 10 is implemented as executed in the step S9.

According to the electricity distribution system, as executed in the steps S8 to S10, the controller which performs control so that electricity in the electric vehicle EV is discharged to the house 10 until the $CO_2$ emission counter value becomes a predetermined target value.

Furthermore, according to the electricity distribution system, as executed in the step S8, the predetermined target value of the $CO_2$ emission counter value is set to 0, and electricity in the electric vehicle EV is discharged to the house 10 until the $CO_2$ emission counter value becomes 0.

According to the electricity distribution system, it is possible to charge the electric vehicle EV without substantial $CO_2$ emissions and it is not necessary to provide a large rechargeable battery for the house 10. Moreover, according to the electricity distribution system, it is possible to charge the electric vehicle EV without emitting $CO_2$.

The results of simulation for the electricity distribution system operating as described above are shown in FIGS. 9 to 12.

Figure 10:
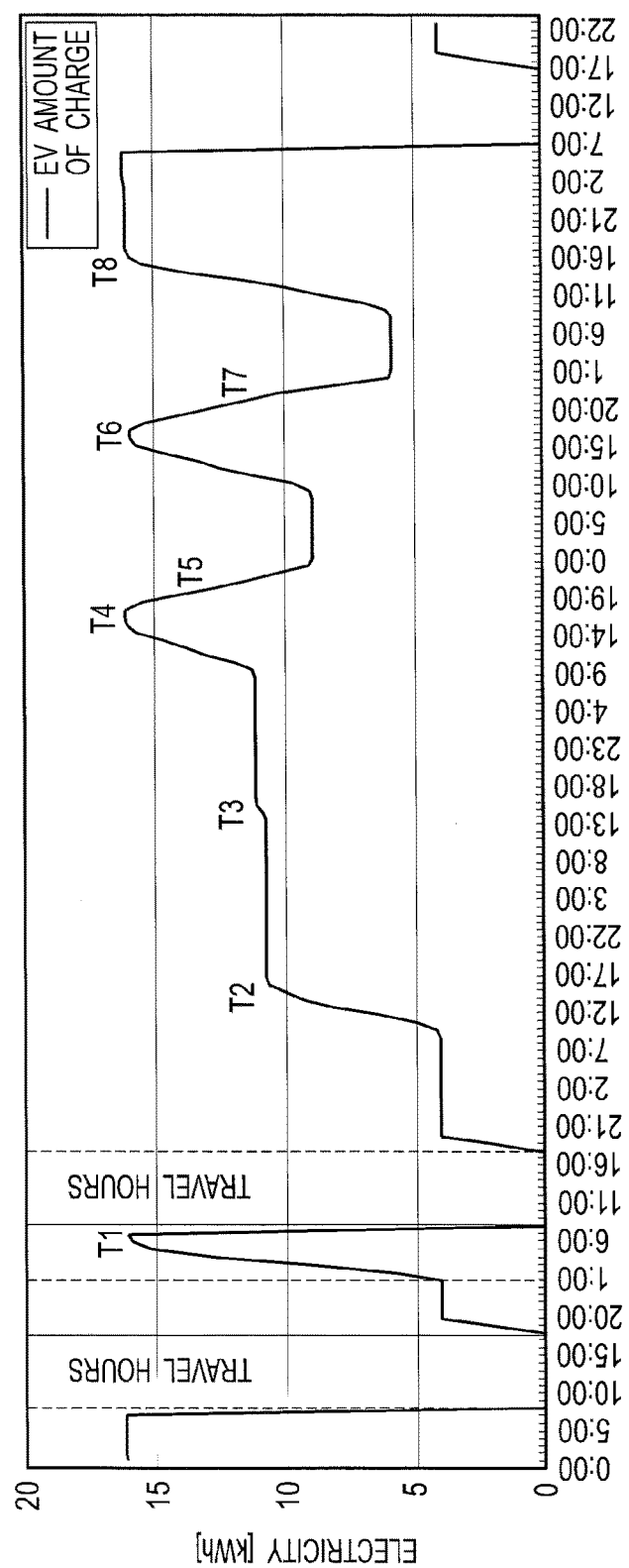
FIG. 10 is a diagram showing an amount of charge of an electric vehicle as the results of simulation of the electricity distribution system as the embodiment of the present invention.

As shown in FIG. 10, the results of simulation are the results of calculation for the situation where the rechargeable battery 32 of the electric vehicle EV is nearly fully charged and the electric vehicle EV is not scheduled to be used after the electric vehicle EV travel hours, the normal charging hours, and the electric vehicle EV travel hours. To be specific, the results of simulation show charging and discharging in eight days, in which the electric vehicle EV travels on the first, second, and eighth days.

Figure 9:
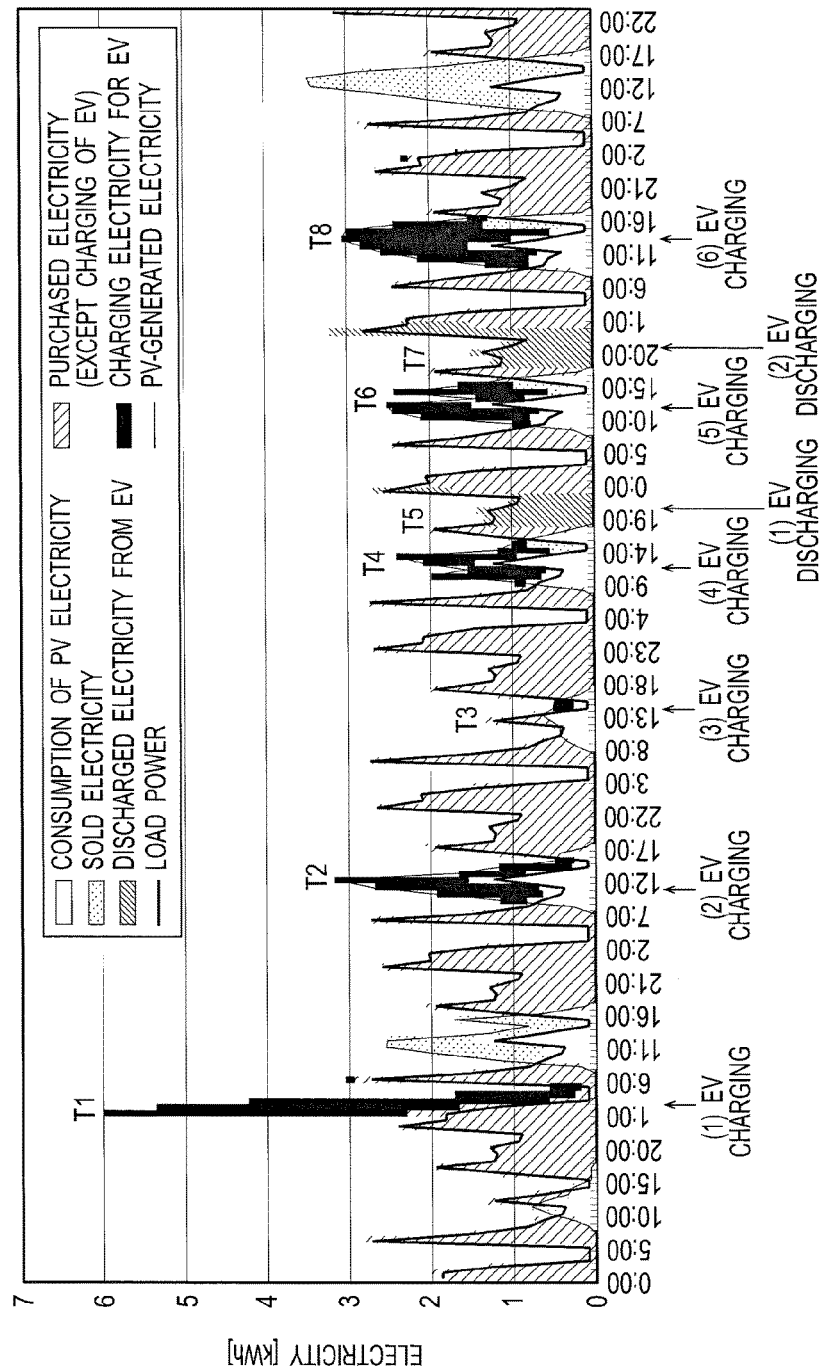
FIG. 9 is a diagram showing change in the amount of electricity as results of simulation of the electricity distribution system as the embodiment of the present invention.
Figure 11:
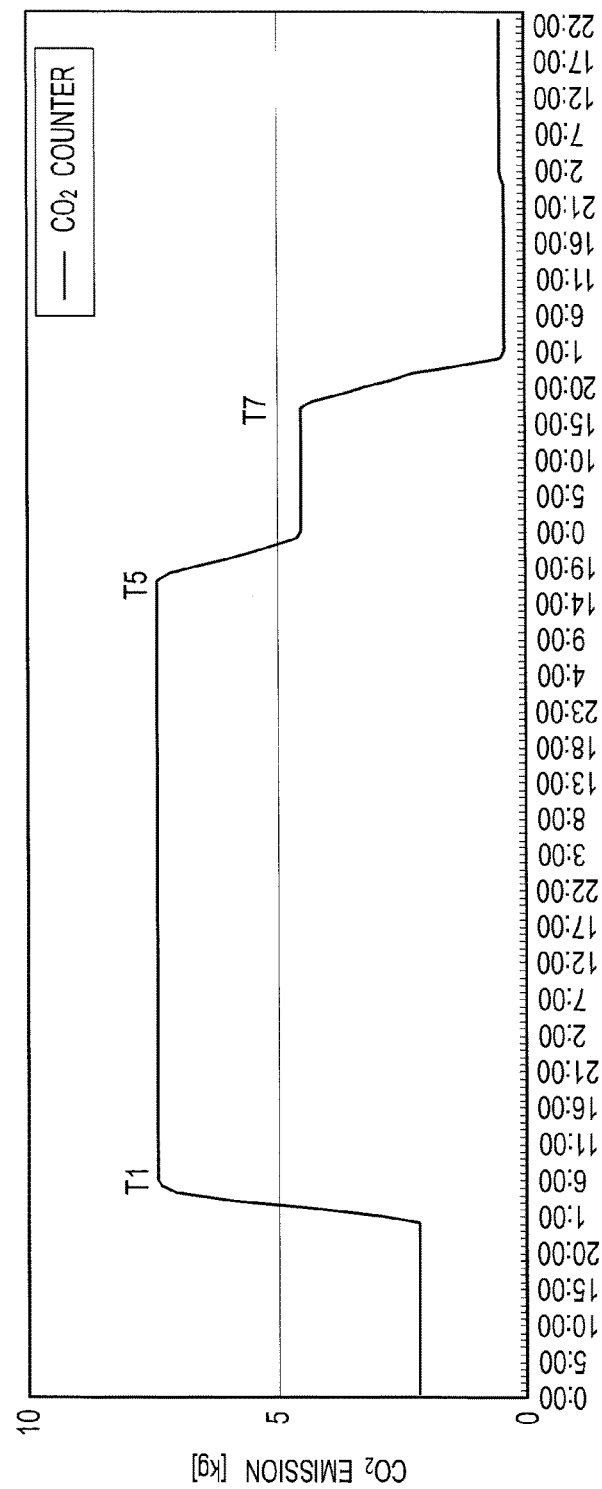
FIG. 11 is a diagram showing the $CO_2$ emission counter value as the results of simulation of the electricity distribution system as the embodiment of the present invention.

FIG. 9 shows changes in the amount of consumption of PV-generated electricity, the amount of electricity sold, the amount of discharging electricity from the EV, the amount of electric load as house power consumption, the amount of grid power as purchased electricity, the amount of charging electricity for the EV, and the amount of PV-generated electricity as in-house generated electricity. FIG. 10 shows changes in the amount of charge in the rechargeable battery 32 of the electric vehicle EV. FIG. 11 shows changes in the $CO_2$ emission counter value.

As shown in FIG. 9, in a time period T1 after the travel hours, the rechargeable battery 32 of the electric vehicle EV is charged from the grid power from the house 10 (operation (1) of charging the EV) because other travel hours are scheduled after the time period T1. Accordingly, as shown in the time period T1 of FIG. 10, the rechargeable battery 32 of the electric vehicle EV is fully charged within the normal charging hours. As shown in the time period T1 of FIG. 11, the normal charging hours are set in the middle of the night, and the $CO_2$ emission counter value is increased as the electric vehicle EV is charged from the grid power.

When the electric vehicle EV is connected to the house 10 after the travel hours following the charging of the electric vehicle EV, the electricity distribution system does not have a travel schedule of the next day. Accordingly, as shown in FIG. 10, operation (2) of charging the electric vehicle EV is performed during a time period T2 when there is a surplus of PV-generated electricity on the next day. By the operation (2) of charging the electric vehicle EV, the amount of charge in the electric vehicle EV is increased in FIG. 10. The $CO_2$ emission counter value of FIG. 11 does not change.

In a time period T3 shown in FIG. 9, operation (3) of charging the electric vehicle EV is performed although the amount of surplus of PV-generated electricity is small, and the amount of charge in the electric vehicle EV increases slightly in FIG. 10. The $CO_2$ emission counter value does not change in FIG. 11.

In a time period T4 shown in FIG. 9, there is a large amount of surplus of PV-generated electricity, and operation (3) charging the electric vehicle EV is performed using the large surplus of PV-generated electricity. As a result, the electric vehicle EV is nearly fully charged in FIG. 10. The $CO_2$ emission counter value does not change in FIG. 11.

In a time period T5 shown in FIG. 9, there is a small capacity remaining in the rechargeable battery 32 of the electric vehicle EV because of the charging in the time period T4, and the amount of surplus of PV-generated electricity is estimated to be large on the next day. Accordingly, operation (1) of discharging electricity from the electric vehicle EV to the house 10 is performed. The amount of charge in the electric vehicle EV is reduced by the same amount as the estimated amount of surplus of PV-generated electricity in FIG. 10. The $CO_2$ emission counter value of FIG. 11 is reduced by this discharging operation (1) but does not reach 0 as the predetermined target value.

In a time period T6 shown in FIG. 9, there is a large surplus of PV-generated electricity, and operation (5) of charging the electric vehicle EV is performed using the large surplus of PV-generated electricity. As a result, the electric vehicle EV of FIG. 10 is nearly fully charged. The $CO_2$ emission counter value of FIG. 11 does not change.

In a time period T7 shown in FIG. 9, there is a small capacity remaining in the rechargeable battery 32 of the electric vehicle EV because of the charging in the time period T6. Moreover, the amount of surplus of PV-generated electricity is estimated to be large on the next day, and operation (2) of discharging electricity from the electric vehicle EV to the house 10 is performed. The amount of charge in the electric vehicle EV shown in FIG. 10 and the $CO_2$ emission counter value of FIG. 11 are reduced by this discharging operation (2). The $CO_2$ emission counter value becomes 0 before the electric vehicle EV is discharged by the same amount as the estimated surplus of PV-generated electricity on the next day. The discharge operation (2) is therefore terminated.

In a time period T8 shown in FIG. 9, there is a large surplus of PV-generated electricity, and operation (6) of charging the electric vehicle EV is performed using the large surplus of PV-generated electricity. As a result, the amount of charge of the electric vehicle EV is nearly fully charged in FIG. 10. The $CO_2$ emission counter value of FIG. 11 does not change.

As described above, according to the electricity distribution system, by the operation shown in FIG. 5, the charging/discharging operations for the electric vehicle EV can be controlled so that the $CO_2$ emission counter value becomes 0 as the predetermined target value.

Figure 12:
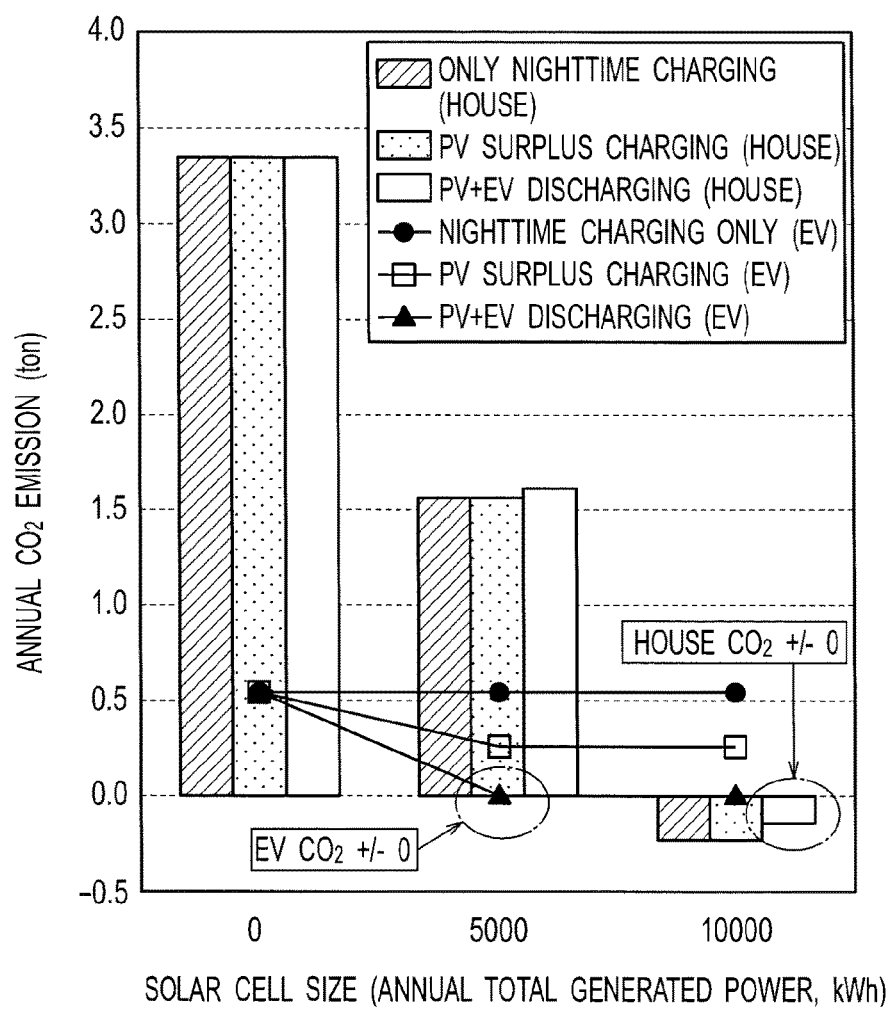
FIG. 12 is a diagram showing an amount of $CO_2$ emissions as the results of simulation of the electricity distribution system as the embodiment of the present invention.

Moreover, FIG. 12 shows the results of simulation obtained by varying the size [kWh] of the electricity generation device 16.

In the case where the electricity generation device 16 is small, the amount of annual $CO_2$ emissions exceeds 3.0 tons when the house 10 is charged from the electrical grid 20 only in the night-time, when the house 10 is charged from the surplus electricity of the electricity generation device 16, and when the house 10 is charged from the surplus electricity of the electricity generation device 16 and the discharging electricity from the electric vehicle EV.

In the case where the electricity generation device 16 has a size of 5000 kWh, the amount of annual $CO_2$ emissions is about 1.5 tons when the house 10 is charged from the electrical grid 20 only in the nighttime and when the house 10 is charged from the surplus electricity of the electricity generation device 16. The amount of annual $CO_2$ emissions exceeds 1.5 tons when the house 10 is charged from the surplus electricity of the electricity generation device 16 and the discharging electricity from the electric vehicle EV.

In the case where the electricity generation device has a size of 10000 kWh, all the in-house power consumption in the house 10 can be covered by the electricity generated by the electricity generation device 16, and the amount of $CO_2$ emissions become negative.

On the other hand, when the operation of charging the electric vehicle EV is set as only nighttime charging, the electricity generation device 16 cannot be used, and the $CO_2$ emissions do not depend on the size of the electricity generation device 16. The amount of annual $CO_2$ emissions is therefore about 0.5 tons. When the electric vehicle EV is charged only from the surplus electricity of the electricity generation device 16, the $CO_2$ emissions cannot be 0 even if the size of the electricity generation device 16 is 5000 kWh or 10000 kWh on a year basis. However, the balance of $CO_2$ emissions of the electric vehicle EV can be controlled to 0 by a combination of the operation of charging the electric vehicle EV from the surplus electricity of the electricity generation device 16 and the operation of discharging electricity from the electric vehicle EV to the house 10 in accordance with the flowchart of FIG. 5.

Furthermore, the electricity distribution system can set the target value of the $CO_2$ emission counter value to other than 0. The electric vehicle EV may be discharged until the $CO_2$ emissions per a travel distance of 1 km of the electric vehicle EV reaches the target value, for example.

In this case, the electricity management device 14 further includes a travel distance acquisition unit acquiring the travel distance of the electric vehicle EV. The electricity management device 14 acquires the travel distance of the electric vehicle EV by communication with the electric vehicle EV. The electricity management device 14 previously sets the $CO_2$ emission coefficient, which indicates the amount of $CO_2$ emissions per unit of the grid power as described above, and a $CO_2$ emission counter value corresponding to target $CO_2$ emissions per unit of the travel distance by the electric vehicle EV. In this state, the electricity management device 14 adds a value to the $CO_2$ emission counter, the added value being obtained by multiplying the amount of charging electricity for the electric vehicle EV from the grid power by the $CO_2$ emission coefficient and dividing the obtained product by the travel distance. On the other hand, the electricity management device 14 performs control so that electricity of the electric vehicle EV is discharged to the house 10 until the amount of $CO_2$ emissions become the $CO_2$ emission counter value corresponding to the target $CO_2$ emissions per unit of the travel distance by the electric vehicle EV.

Accordingly, the electricity distribution system can operate so as to reduce the $CO_2$ emissions per distance traveled by the electric vehicle EV although the $CO_2$ emissions cannot be 0.

Next, a description is given of another embodiment of the aforementioned electricity distribution system.

Figure 13:
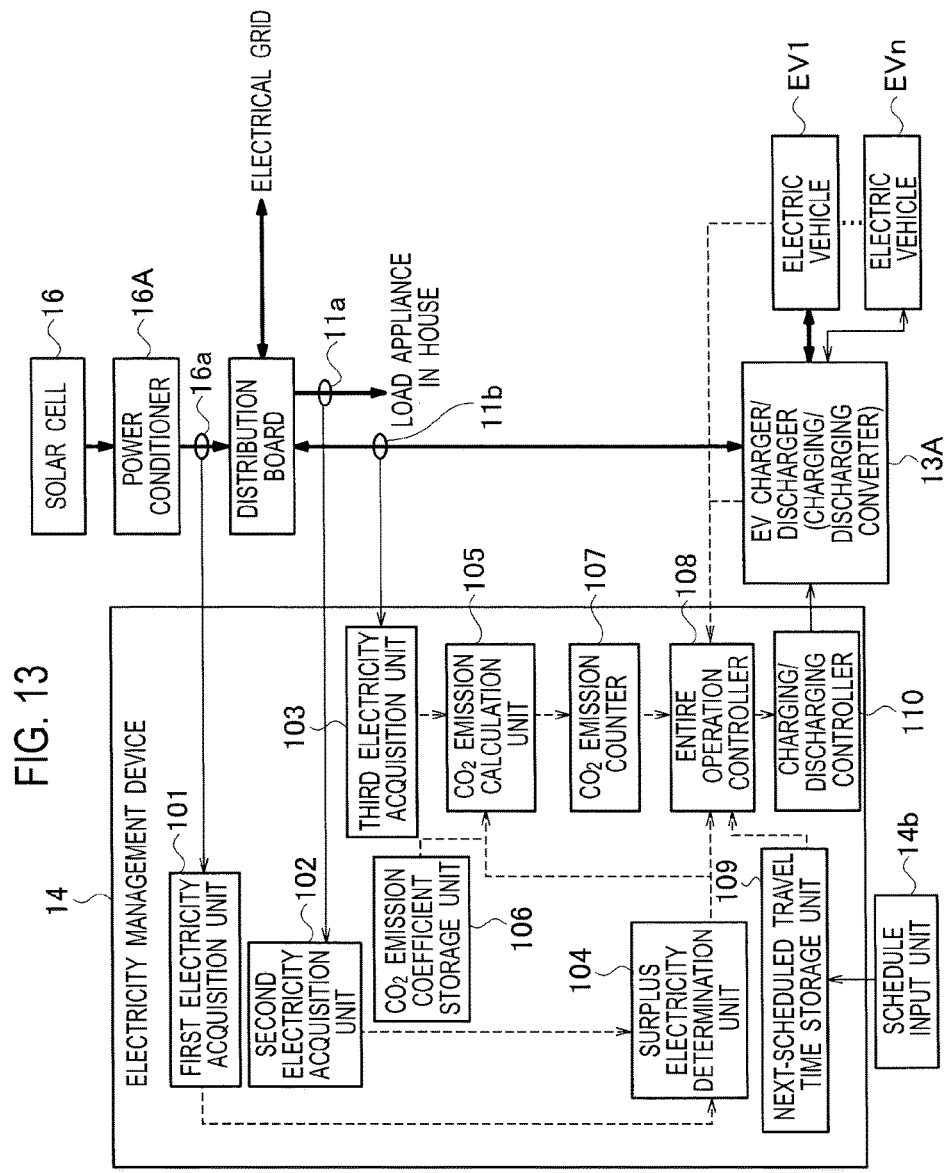
FIG. 13 is a block diagram illustrating another configuration of the electricity distribution system as the embodiment of the present invention.

As illustrated in FIG. 13, this electricity distribution system may include plural electric vehicles EV1, . . . , and EVn. The plural electric vehicles EV are connected to the EV charger/discharger 13A. In this electricity distribution system, the electricity management device 14 increases the $CO_2$ emission counter value in accordance with the amount of charging electricity for the plural electric vehicles EV and reduces the same in accordance with the amount of discharging electricity from the plural electric vehicle EV. The electricity management device 14 sums up the amount of $CO_2$ emissions of each electric vehicle EV and performs control so that the total amount of $CO_2$ emissions becomes 0.

In the thus-configured electricity distribution system, the electricity management device 14 identifies each electric vehicle EV through communication or the like. The electricity management device 14 includes plural $CO_2$ emission counter values corresponding to the respective electric vehicles EV and sums up the $CO_2$ emissions stored by each $CO_2$ emission counter value. The electricity distribution system can thereby control the amount of $CO_2$ emissions to the predetermined target value through the plural electric vehicles EV.

As for the determination whether the surplus of PV-generated electricity on the next day can be used for charging, it can be determined that the plural electric vehicles EV can be charged with reference to the schedule of the plural electric vehicles EV. The charger/discharger 13A may include plural charging ports to charge/discharge the plural electric vehicle EV simultaneously. In this configuration, the measurement of charging and discharging electricity for each electric vehicle EV may be performed by the EV charger/discharger 13A instead of the sensor and electricity management device 14.

Furthermore, when the electricity distribution system includes plural electric vehicles EV and performs control so that the total amount of $CO_2$ emissions, which is obtained by summing up the $CO_2$ emissions of each electric vehicle EV, the electricity distribution system may be configured to preferentially perform discharging operation for the electric vehicle EV having a smaller amount of charging/discharging electricity. This can prevent deterioration of the rechargeable batteries of the electric vehicles EV.

Still furthermore, in order to prevent deterioration of the rechargeable batteries 32 due to the charging/discharging operation, the electricity distribution system may be configured to disable the discharging operation for the electric vehicle EV whose total amount of charging electricity (the accumulated amount of charging electricity since production) exceeds a predetermined value. Alternatively, the electricity distribution system may be configured to perform control that calculates the ratio of the total amounts of charging electricity for the electric vehicles EV and, when the calculated ratio is higher than a predetermined value, disabling the discharging operation of the electric vehicle EV whose total amount of charging electricity is large. This can prevent the deterioration of the rechargeable batteries due to the discharging operation for the electric vehicles EV from excessively progressing.

The above total amount of charging electricity may be replaced with the accumulated value of the amounts of discharging electricity. This can equally deteriorate the electric vehicles EV by the operation of discharging electricity to the house 10. Alternatively, instead of the total amount of charging electricity, the ratio of the total amount of charging electricity to the total travel distance can be used. This is because the deterioration due to the operation of discharging electricity to the house 10 depends on the travel distance of the electric vehicle EV.

Moreover, the aforementioned embodiment shows an example in which the single electricity management device 14 is provided for the single house 10 to perform management of $CO_2$ emissions and control of charging/discharging. However, the control may be integrally performed based on the total amount of $CO_2$ emissions of plural electric vehicles EV at plural houses 10. The amount of $CO_2$ emissions can be totally adjusted to 0 for the plural electric vehicles EV even when family members live in separate places but share the electric vehicle EV or when family members visit their houses each other and charge the electric vehicle EV at another member's house. Furthermore, the electricity distribution system can be designed so that an owner's group of the same type of electric vehicles EV cooperates to control $CO_2$ emissions to 0, for example. Moreover, it is possible to give an incentive such as a free gift to the user who especially contributes to the reduction of $CO_2$ emissions.

The electricity distribution system may be configured to perform control taking an account of $CO_2$ emissions when the user charges the electric vehicle EV in a place outside the house 10. The electricity distribution system is configured so that the amounts of electricity which is stored in the electric vehicle EV outside the house 10 are accumulated and the electric vehicle EV notifies the house 10 of the same. When the electric vehicle EV is connected to the charger/discharger, the $CO_2$ emissions due to charging outside the house 10 are added to the $CO_2$ emission counter.

Figure 14:
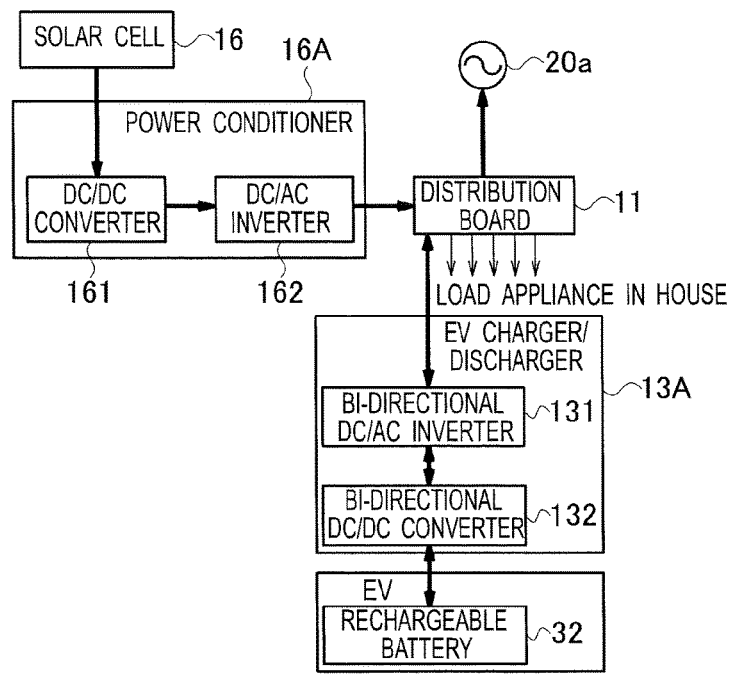
FIG. 14 is a block diagram illustrating a circuit configuration as a comparative example.
Figure 15:
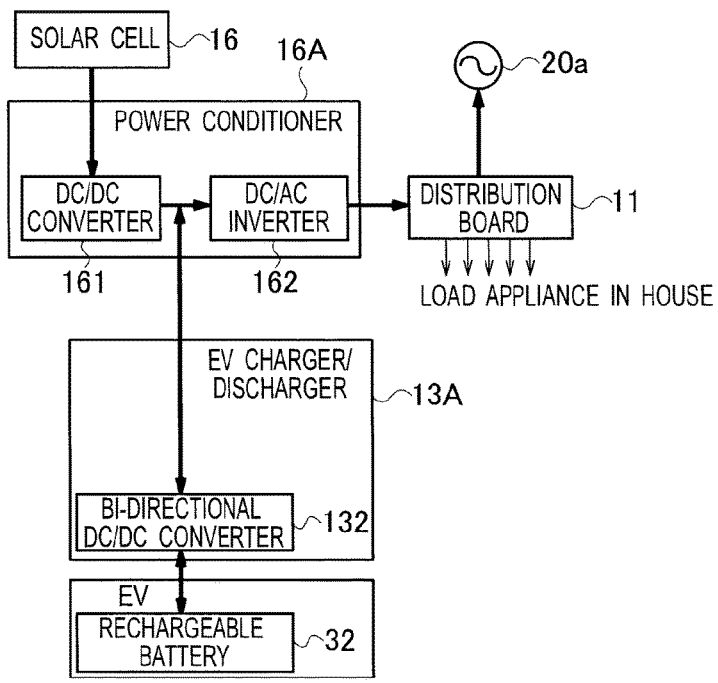
FIG. 15 is a block diagram illustrating a circuit configuration in the electricity distribution system as the embodiment of the present invention.

Next, in the aforementioned electricity distribution system, it is desirable that the power conditioner 16A, distribution board 11, and EV charter/discharger 13A are configured as illustrated in FIG. 15 instead of the general circuit configuration as illustrated in FIG. 14.

In FIG. 15, the EV charger/discharger 13A and the rechargeable battery 32 of the electric vehicle EV are connected between a DC/DC converter 161 and DC/AC converter 162 of the power conditioner 16A. The DC/DC converter 161 converts the PV-generated electricity to the voltage for the house 10 and supplies the same to the EV charger/discharger 13A. A bi-directional DC/DC converter 132 of the EV charger/discharger 13A raises the voltage for the house 10 to the charging voltage and supplies the same to the rechargeable battery 32 of the electric vehicle EV. The bi-directional DC/DC converter 132 lowers the voltage of discharging electricity from the electric vehicle EV to the voltage for the house 10 and supplies the same to the DC/DC converter 162 of the power conditioner 16A.

In the aforementioned configuration, the PV-generated electricity by the electricity generation device 16 can be used to charge the electric vehicle EV through the DC/DC converter 161 and the bi-directional DC/DC converter 132.

On the other hand, the discharging electricity from the electric vehicle EV can be supplied to the distribution board 11 through the bi-directional DC/DC converter 132 and the DC/AC converter 162.

On the other hand, in the configuration of FIG. 14 as a comparative example, the PV-generated electricity by the electricity generation device 16 is converted to AC power for the house 10 by the DC/DC converter 161 and DC/AC converter 162 to be supplied to the distribution board 11. Thereafter, the charging electricity for the electric vehicle EV is converted to DC power by the bi-directional DC/AC converter 131 of the EV charger/discharger 13A to be raised in voltage by the bi-directional DC/DC converter 132 for charging of the electric vehicle EV. On the other hand, the discharging electricity from the electric vehicle EV has the voltage lowered for the house 10 by the bi-directional DC/DC converter 132 and is converted to AC power by the bi-directional DC/AC converter 131 to be supplied to the distribution board 11.

As described above, the circuit configuration of the electricity distribution system is changed so that the DC power from the electricity generation device 16 is directly supplied to the EV charger/discharger 13A, not via the distribution board 11. This can reduce the power loss at charging/discharging of the electric vehicle EV.

When the electric vehicle EV is charged using the grid power, the charging is performed through the bi-directional DC/AC and DC/DC converters in either of the configurations of FIGS. 14 and 15. The losses in the power circuits thereof are therefore the same. However, when the electric vehicle EV is charged using the surplus of PV-generated electricity by the electricity generation device 16, the generated electricity is once converted to AC power and is then converted to DC power in FIG. 14, which can cause a power loss. In contrast, the power loss is smaller in the configuration example of FIG. 5.

In such a manner, according to the electricity distribution system which charges the electric vehicle EV with surplus electricity generated at the PV electricity generation by the electricity generation device 16 as shown in FIG. 5, it is possible to perform power conversion at a high efficiency.

The aforementioned embodiment is an example of the present invention. Accordingly, it is certain that the present invention is not limited to the aforementioned embodiment and, in addition to the embodiment, the present invention can be variously changed in accordance with the design and the like without departing from the technical idea according to the present invention.

In the embodiment, the $CO_2$ emission counter value is increased or reduced based on the amount of $CO_2$ emissions obtained by multiplying the charging/discharging electricity of the electric vehicle EV by the $CO_2$ emission coefficient but may be increased or reduced based on an index other than the amount of $CO_2$ emissions. For example, instead of the $CO_2$ emission coefficient, the index to change the counter value may be unit price of electricity. In this case, when the electric vehicle EV is charged from the grid power, the electricity management device 14 multiplies the amount of charging electricity by the unit price of electricity to calculate the price of the electricity and increases the counter value. On the other hand, when electricity is discharged from the house 10 to the electric vehicle EV, the electricity management device 14 multiplies the amount of discharging electricity by the unit price of electricity to calculate the price of the electricity and reduces the counter value.

In the case of charging the electric vehicle EV from the surplus electricity generated by the electricity generation device 16 such as a photovoltaic power generation device, the unit selling price of electricity is used. In the case of charging the electric vehicle EV from a larger amount of electricity than the surplus electricity generated by the electricity generation device 16, the unit price of electricity is used in calculation for the extra charging electricity. In the case where the electricity generation device 16 is not generating electricity, the unit price of electricity is used. Accordingly, as the electric vehicle EV is charged from PV-generated electricity, the counter value can be increased by the product of the amount of electricity generated by an electricity selling price coefficient. As the electric vehicle EV is charged from the grid power, the counter value can be increased by the product of the supplied grid power by an electricity price coefficient.

The entire contents of Japanese Patent Application Publication No. 2011-254883 (filed on: Nov. 11, 2011) are incorporated herein by reference.

INDUSTRIAL APPLICABILITY

According to the present invention, it is possible to present the amount of carbon dioxide actually emitted for an electric vehicle by an increase/a decrease in the counter value and charge the electric vehicle without emitting carbon dioxide.

REFERENCE SIGNS LIST

EV ELECTRIC VEHICLE
10 HOUSE
11 DISTRIBUTION BOARD (ELECTRICITY DISTRIBUTION UNIT)
13 CHARGING/DISCHARGING CONVERTER (ELECTRICITY DISTRIBUTION UNIT)
13A EV CHARGING/DISCHARGING CONVERTER (ELECTRICITY DISTRIBUTION UNIT)
14 ELECTRICITY MANAGEMENT DEVICE (CHARGING ELECTRICITY ACCUMULATOR, DISCHARGING ELECTRICITY ACCUMULATOR, TRAVEL DISTANCE ACQUISITION UNIT, AND ELECTRICITY MANAGEMENT UNIT)
16 ELECTRICITY GENERATION DEVICE (ELECTRICITY GENERATOR)
32 RECHARGEABLE BATTERY
105 $CO_2$ EMISSION CALCULATION UNIT (CHARGING ELECTRICITY ACCUMULATOR, DISCHARGING ELECTRICITY ACCUMULATOR)
106 $CO_2$ EMISSION COEFFICIENT STORAGE UNIT (CHARGING ELECTRICITY ACCUMULATOR, DISCHARGING ELECTRICITY ACCUMULATOR)
107 $CO_2$ EMISSION COUNTER(CHARGING ELECTRICITY ACCUMULATOR, DISCHARGING ELECTRICITY ACCUMULATOR)
108 ENTIRE OPERATION CONTROLLER
110 CHARGING/DISCHARGING CONTROLLER (CONTROLLER)

The invention claimed is:

1. An electricity management device, comprising:
an electricity accumulator which increases a counter value as a rechargeable battery of an electric vehicle is charged from grid power that is supplied from an electrical grid and retains the counter value when the rechargeable battery of the electric vehicle is charged from electricity that is generated by an electricity generation device of a house that generates electricity without producing $CO_2$; and which reduces the counter value as electricity in the rechargeable battery of the electric vehicle is discharged into the house,
a controller which performs control so that the electricity in the rechargeable battery of the electric vehicle is discharged into the house until the counter value becomes a predetermined target value, and
a travel distance acquisition unit acquiring travel distance of the electric vehicle,
wherein:
a carbon dioxide emission coefficient and a counter target value are previously set, the carbon dioxide emission coefficient indicating an amount of carbon dioxide emissions per unit of the grid power, and the counter target value corresponding to an amount of carbon dioxide emissions per unit of the travel distance by the electric vehicle,
the electricity accumulator adds a value to the counter value, the added value is obtained by multiplying the amount of charging electricity of the rechargeable battery of the electric vehicle from the grid power by the carbon dioxide emission coefficient and dividing the obtained product by the travel distance acquired by the travel distance acquisition unit, and
the controller performs control so that the electricity in the rechargeable battery of the electric vehicle is discharged into the house until the counter value becomes the counter target value corresponding to the amount of carbon dioxide emissions per unit of the travel distance of the electric vehicle.

2. The electricity management device according to claim 1, wherein
the predetermined target value is set to 0, and
the controller performs control so that the electricity in the rechargeable battery of the electric vehicle is discharged into the house until the counter value becomes 0.

3. The electricity management device according to claim 1, further comprising a display unit displaying the counter value or information corresponding to the counter value.

4. The electricity management device according to claim 1, wherein the electricity accumulator increases the counter value in accordance with the amount of charging electricity for a plurality of electric vehicles, and
the electricity accumulator reduces the counter value in accordance with the amount of electricity discharged by the plurality of electric vehicles.

5. An electricity management device, comprising:
an electricity accumulator which increases a counter value as a rechargeable battery of an electric vehicle is charged from grid power that is supplied from an electrical grid and retains the counter value when the rechargeable battery of the electric vehicle is charged from electricity that is generated by an electricity generation device of a house that generates electricity without producing $CO_2$; and which reduces the counter value as electricity in the rechargeable battery of the electric vehicle is discharged into the house, and
a controller which performs control so that the electricity in the rechargeable battery of the electric vehicle is discharged into the house until the counter value becomes a predetermined target value,
wherein:
the controller estimates an amount of electricity generated by the electricity generation device on the next day and an electricity demand of the house on the next day, and the controller performs control so that the electricity in the rechargeable battery of the electric vehicle is discharged into the house only when it is predicted that the rechargeable battery of the electric vehicle can be fully charged, a carbon dioxide emission coefficient indicating an amount of carbon dioxide emissions per unit of the grid power is previously set, and the counter value is set to the amount of carbon dioxide emissions which is obtained by multiplying the carbon dioxide emission coefficient by the amount of charging electricity and the amount of electricity discharged.

6. The electricity management device according to claim 5, wherein the controller sets the upper limit of the amount of electricity discharged from the rechargeable battery of the electric vehicle into the house to an amount of surplus electricity which is obtained by subtracting the estimated electricity demand of the house of the next day from the estimated amount of electricity generated by the electricity generation device on the next day.

* * * * *